United States Patent
Hormis et al.

(10) Patent No.: US 11,569,583 B2
(45) Date of Patent: Jan. 31, 2023

(54) MULTI-BEAM ROUTING USING A LENS ANTENNA

(71) Applicant: QUALCOMM Incorporated, San Diego, CA (US)

(72) Inventors: Raju Hormis, New York, NY (US); Junyi Li, Franklin Park, NJ (US); Juergen Cezanne, Ocean Township, NJ (US); Navid Abedini, Basking Ridge, NJ (US); Ozge Koymen, Princeton, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 80 days.

(21) Appl. No.: 17/159,840

(22) Filed: Jan. 27, 2021

(65) Prior Publication Data
US 2022/0239010 A1    Jul. 28, 2022

(51) Int. Cl.
*H01Q 19/06* (2006.01)
*H01Q 15/08* (2006.01)

(52) U.S. Cl.
CPC .......... *H01Q 19/062* (2013.01); *H01Q 15/08* (2013.01)

(58) Field of Classification Search
CPC ...... H01Q 19/062; H01Q 15/08; H01Q 1/242; H04B 3/232; H04B 7/0408; H04B 7/0695; H04B 7/15535; H04B 7/15571; H03F 3/602; H03G 3/3052; H04W 16/28; H04W 24/02
See application file for complete search history.

(56) References Cited

U.S. PATENT DOCUMENTS

| | | | |
|---|---|---|---|
| 4,204,093 A | 5/1980 | Yeh | |
| 8,244,175 B2 | 8/2012 | Rofougaran | |
| 9,749,037 B2 | 8/2017 | Fujimura | |
| 10,721,634 B2 | 7/2020 | Rofougaran et al. | |
| 2018/0351251 A1* | 12/2018 | Matitsine | H01Q 25/00 |
| 2020/0083611 A1 | 3/2020 | Hasegawa et al. | |
| 2021/0013953 A1* | 1/2021 | Hormis | H04L 5/14 |

OTHER PUBLICATIONS

Miujammami E.H., et al., "Optimum Wideband High Gain Analog Beamforming Network for 5G Applications", IEEE Access, Electrical and Computer Engineering Department, vol. 7, Apr. 18, 2019, pp. 52226-52237.

Quevedo-Teruel O., et al., "Glide-Symmetric Fully Metallic Luneburg Lens for 5G Communications at Ka-Band", IEEE Antennas and Wireless Propagation Letters, vol. 17, No. 9, Sep. 2018, pp. 1588-1592.

International Search Report and Written Opinion—PCT/US2022/012745—ISA/EPO—dated May 27, 2022 11 pp.

* cited by examiner

*Primary Examiner* — Andrea Lindgren Baltzell
(74) *Attorney, Agent, or Firm* — Qualcomm Incorporated

(57) ABSTRACT

Aspects of the disclosure relate to a node using at least one lens antenna for efficient, effective, and simultaneous multiple beam routing. The node may include a switch matrix communicatively coupling the first antenna with the second antenna. The first antenna may receive and/or transmit one or more directional beams. The second antenna may transmit and/or receive other one or more directional beams. The node may further include a controller configured to control the switch matrix for the coupling. Other aspects, embodiments, and features are also claimed and described.

12 Claims, 16 Drawing Sheets

MULTI-BEAM ROUTING USING A LENS ANTENNA

TECHNICAL FIELD

The technology discussed below relates generally to wireless communication systems, and more particularly, to beam routing.

INTRODUCTION

As the demand for mobile broadband access continues to increase, research and development continue to advance wireless communication technologies not only to meet the growing demand for mobile broadband access, but to advance and enhance the user experience with mobile communications. Recently, millimeter-wave (mmWave) frequency bands such as those above 24 GHz have become available for mobile communications. However, interoperable communication protocols and technologies at the mmWave frequency bands are still at an incipient stage while the mmWave spectrum has different characteristics to handle, such as a high path loss and directionality.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In various aspects, the present disclosure provides for efficient, effective, and simultaneous multi-beam routing in the sub-6 GHz and/or mmWave spectrum. In some aspects, a node may also include a switch matrix communicatively coupled between a first antenna and a first lens antenna. The first antenna may receive first one or more directional beams and generate first one or more signals corresponding to the first one or more directional beams. The first antenna may also transmit second one or more directional beams corresponding to second one or more signals. The first lens antenna may transmit third one or more directional beams corresponding to third one or more signals. The first lens antenna may also receive fourth one or more directional beams and generate fourth one or more signals corresponding to the fourth one or more directional beams. The controller may also control the switch matrix for communicatively coupling the first one or more signals with the third one or more signals. In addition, the controller may control the switch matrix for communicatively coupling the fourth one or more signals with the second one or more signals.

In some aspects, the present disclosure provides a node for wireless communication. The node may include a first means for communicatively coupling a first antenna with a first lens antenna. The first antenna may receive first one or more directional beams and generate first one or more signals corresponding to the first one or more directional beams. The first antenna may also transmit second one or more directional beams corresponding to second one or more signals. The first lens antenna may transmit third one or more directional beams corresponding to third one or more signals. The first lens antenna may also receive fourth one or more directional beams and generate fourth one or more signals corresponding to the fourth one or more directional beams. The node may further include a second means for controlling the first means communicatively coupled between the first antenna and the first lens antenna. The second means may be configured to control communicatively coupling the first one or more signals with the third one or more signals. The second means may be also configured to control communicatively coupling the fourth one or more signals with the second one or more signals.

In some aspects, the present disclosure provides a method for wireless communications. The method may include receiving, from a first antenna, first one or more directional beams; generating first one or more signals corresponding to the first one or more directional beams; transmitting, from a first lens antenna, third one or more directional beams corresponding to third one or more signals; communicatively coupling, by a switch matrix, the first antenna with the first lens antenna; and controlling the switch matrix for communicatively coupling the first one or more signals with the third one or more signals. The method may further include: receiving, from the first lens antenna, fourth one or more directional beams; generating fourth one or more signals corresponding to the fourth one or more directional beams; transmitting, from the first antenna, second one or more directional beams corresponding to second one or more signals; determining second one or more directions to transmit the second one or more directional beams; communicatively coupling, by the switch matrix, the first antenna with the first lens antenna; and controlling the switch matrix for communicatively coupling the fourth one or more signals with the second one or more signals.

In some aspects, the present disclosure explains a node for wireless communications. The node may include a processor, a transceiver communicatively coupled to the processor, a memory communicatively coupled to the processor, and a switch matrix communicatively coupled to the transceiver and the processor. The processor and the memory are configured to receive, from the first antenna, first one or more directional beams; generate first one or more signals corresponding to the first one or more directional beams; transmit, from the first lens antenna, third one or more directional beams corresponding to third one or more signals; communicatively couple, by the switch matrix, the first antenna with the first lens antenna; and control the switch matrix for communicatively coupling the first one or more signals with the third one or more signals. The processor and the memory may be further configured to receive, from the first lens antenna, fourth one or more directional beams; generate fourth one or more signals corresponding to the fourth one or more directional beams; transmit, from the first antenna, second one or more directional beams corresponding to second one or more signals; communicatively couple, by the switch matrix, the first antenna with the first lens antenna; and control the switch matrix for communicatively coupling the fourth one or more signals with the second one or more signals.

These and other aspects of the invention will become more fully understood upon a review of the detailed description, which follows. Other aspects, features, and embodiments will become apparent to those of ordinary skill in the art, upon reviewing the following description of specific, exemplary embodiments in conjunction with the accompanying figures. While the following description may discuss various advantages and features relative to certain embodiments and figures, all embodiments can include one or more of the advantageous features discussed herein. In other words, while this description may discuss one or more embodiments as having certain advantageous features, one or more of such features may also be used in accordance with the various embodiments discussed herein. In similar fashion, while this description may discuss exemplary embodiments as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, those skilled in the art will readily recognize that these concepts may be practiced without these specific details. In some instances, this description provides well known structures and components in block diagram form in order to avoid obscuring such concepts.

While this description describes aspects and embodiments by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Figure 1:
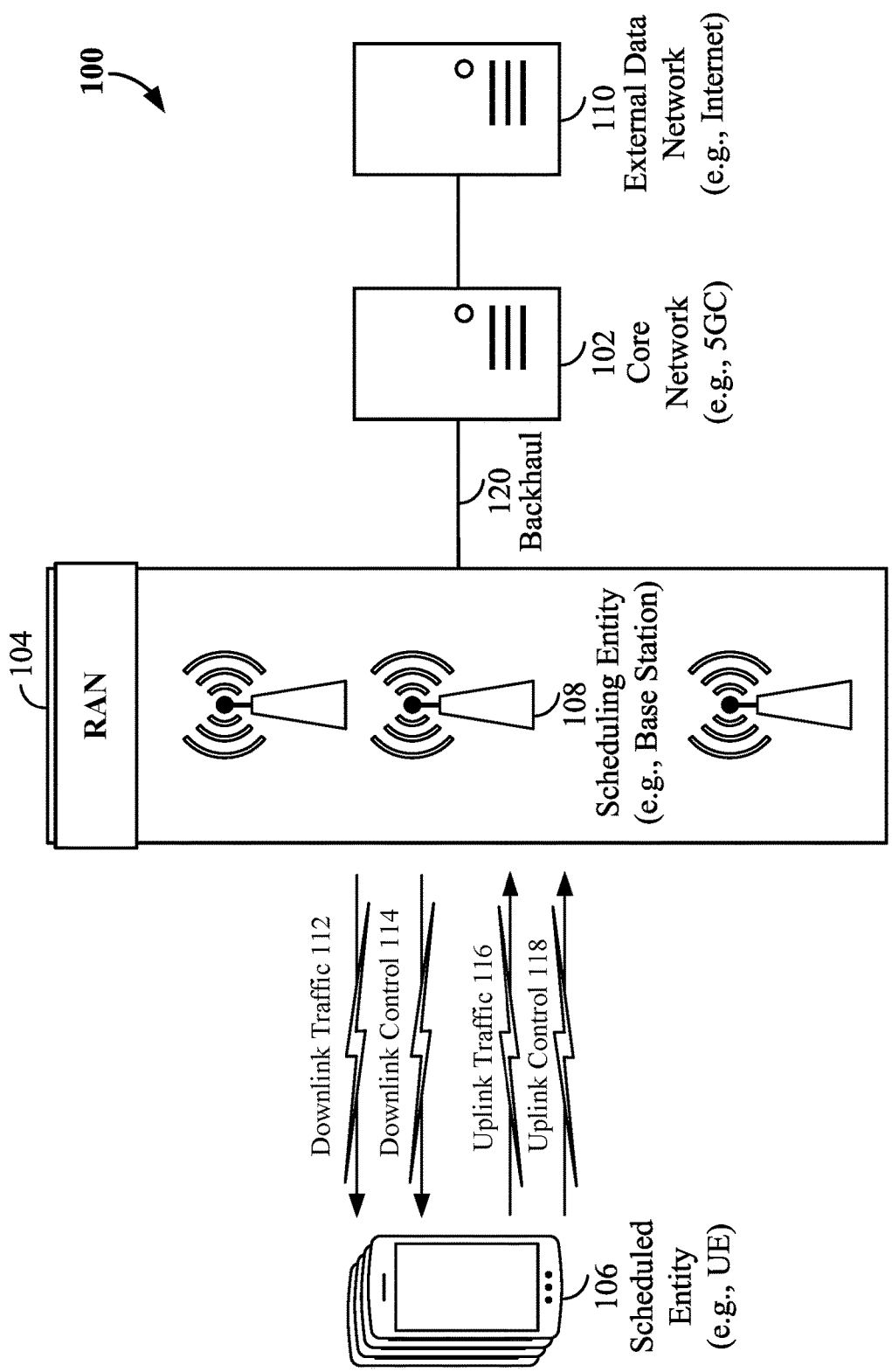
FIG. 1 is a schematic illustration of a wireless communication system according to some aspects.

The disclosure that follows presents various concepts that may be implemented across a broad variety of telecommunication systems, network architectures, and communication standards. Referring now to FIG. 1, as an illustrative example without limitation, this schematic illustration shows various aspects of the present disclosure with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 supports wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multicopter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

A node may be, but may not be limited to, a scheduling entity, a scheduled entity, a base station, a UE, a relay node, any suitable type of entity to have capacity to receive and/or transmit a signal.

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
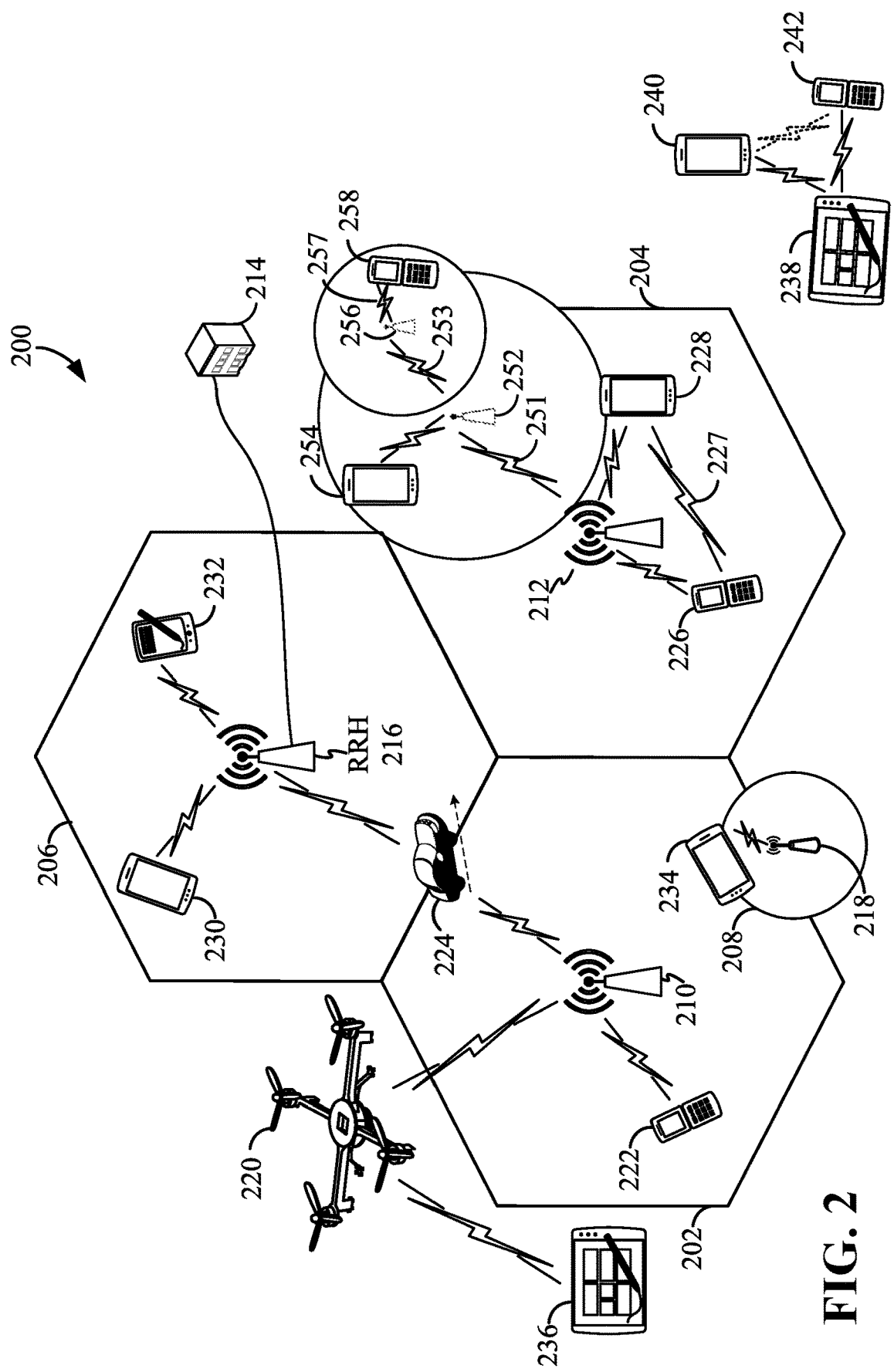
FIG. 2 is a conceptual illustration of an example of a radio access network according to some aspects.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

In FIG. 2, a relay node 252 may be deployed to extend the size or coverage area of a given cell. The relay node 252 may be within the cell 204 of the base station 212. A relay or forward link 251 may be used between the base station 212 and the relay node 251. The base station 212 may transmit signals to the relay node 252 through the relay or forward link 251. Then, the relay node 252 may forward the signals to a UE 254 or another relay node 256 through access link(s) 253. While the relay node 252 may access the UE 254 and another relay node 256, the UE 254 and another relay node 256 may not be within the cell 204 of the base station 212. The access link 253 between the relay node 252 and another relay node 256 may be a relay or forward link 253 to another relay node 256. Another relay node 256 may receive the signals from the relay node 252 through the relay or forward link 253 and forward the signals to a different UE 258 through the access link 257. Similarly, although another relay node 252 may access the UE 258, the base station 212 or the relay node 252 may not access the UE 258 because the UE 258 may not be within the coverage area that the base station 212 or the relay node 252 can serve.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

The air interface in the radio access network 200 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

Figure 3:
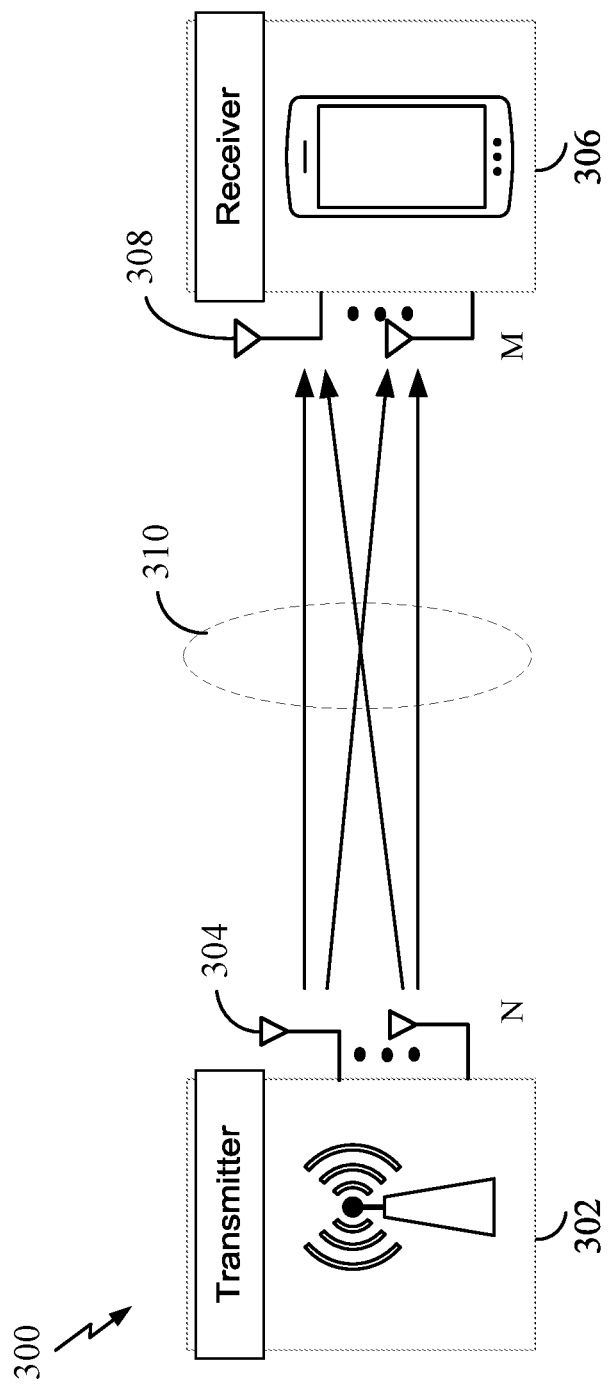
FIG. 3 is a block diagram illustrating a wireless communication system supporting multiple-input multiple-output (MIMO) communication.

In some aspects of the disclosure, the scheduling entity and/or scheduled entity may be configured with multiple antennas for beamforming and/or multiple-input multiple-output (MIMO) technology. FIG. 3 illustrates an example of a wireless communication system 300 with multiple antennas, supporting beamforming and/or MIMO. The use of such multiple antenna technology enables the wireless communication system to exploit the spatial domain to support spatial multiplexing, beamforming, and transmit diversity.

Beamforming generally refers to directional signal transmission or reception. For a beamformed transmission, the amplitude and phase of each antenna in an array of antennas may be precoded, or controlled to create a desired (e.g., directional) pattern of constructive and destructive interference in the wavefront. In a MIMO system, a transmitter 302 includes multiple transmit antennas 304 (e.g., N transmit antennas) and a receiver 306 includes multiple receive antennas 308 (e.g., M receive antennas). Thus, there are N×M signal paths 310 from the transmit antennas 304 to the receive antennas 308. Each of the transmitter 302 and the receiver 306 may be implemented, for example, within a scheduling entity 108, a scheduled entity 106, or any other suitable wireless communication device.

In a MIMO system, spatial multiplexing may be used to transmit multiple different streams of data, also referred to as layers, simultaneously on the same time-frequency resource. In some examples, transmitter may send multiple data streams to a single receiver. In this way, a MIMO system takes advantage of capacity gains and/or increased data rates associated with using multiple antennas in rich scattering environments where channel variations can be tracked. Here, the receiver may track these channel variations and provide corresponding feedback to the transmitter. In the simplest case, as shown in FIG. 3, a rank-2 (i.e., including 2 data streams) spatial multiplexing transmission on a 2×2 MIMO antenna configuration will transmit two data streams via two transmit antennas 304. The signal from each transmit antenna 304 reaches each receive antenna 308 along a different signal path 310. The receiver 306 may then reconstruct the data streams using the received signals from each receive antenna 308.

In some examples, a transmitter may send multiple data streams to multiple receivers. This is generally referred to as multi-user MIMO (MU-MIMO). In this way, a MU-MIMO system exploits multipath signal propagation to increase the overall network capacity by increasing throughput and spectral efficiency, and reducing the required transmission energy. This is achieved by spatially precoding (i.e., multiplying the data streams with different weighting and phase shifting) each data stream (in some examples, based on known channel state information) and then transmitting each spatially precoded stream through multiple transmit antennas to the receiving devices using the same allocated time-frequency resources. The receiver may transmit feedback including a quantized version of the channel so that the transmitter can schedule the receivers with good channel separation. The spatially precoded data streams arrive at the receivers with different spatial signatures, which enables the receiver(s) (in some examples, in combination with known channel state information) to separate these streams from one another and recover the data streams destined for that receiver. In the other direction, multiple transmitters can each transmit a spatially precoded data stream to a single receiver, which enables the receiver to identify the source of each spatially precoded data stream.

The number of data streams or layers in a MIMO or MU-MIMO (generally referred to as MIMO) system corresponds to the rank of the transmission. In general, the rank of a MIMO system is limited by the number of transmit or receive antennas 304 or 308, whichever is lower. In addition, the channel conditions at the receiving device, as well as other considerations, such as the available resources at the transmitting device, may also affect the transmission rank. For example, a base station in a cellular RAN may assign a rank (and therefore, a number of data streams) for a DL transmission to a particular UE based on a rank indicator (RI) the UE transmits to the base station. The UE may determine this RI based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI along with resource information (e.g., the available resources and amount of data to be scheduled for the UE) to assign a DL transmission rank to the UE.

The transmitting device determines the precoding of the transmitted data stream or streams based, e.g., on known channel state information of the channel on which the transmitting device transmits the data stream(s). For example, the transmitting device may transmit one or more suitable reference signals (e.g., a channel state information reference signal, or CSI-RS) that the receiving device may measure. The receiver may then report measured channel quality information (CQI) back to the transmitting device. This CQI generally reports the current communication channel quality, and in some examples, a requested transport block size (TBS) for future transmissions to the receiver. In some examples, the receiver may further report a precoding matrix indicator (PMI) back to the transmitting device. This PMI generally reports the receiving device's preferred precoding matrix for the transmitting device to use, and may be indexed to a predefined codebook. The transmitting device may then utilize this CQI/PMI to determine a suitable precoding matrix for transmissions to the receiver.

In Time Division Duplex (TDD) systems, the UL and DL may be reciprocal, in that each uses different time slots of the same frequency bandwidth. Therefore, in TDD systems, a base station may assign a rank for DL MIMO transmissions based on an UL SINR measurement (e.g., based on a sounding reference signal (SRS) or other pilot signal transmitted from the UE). Based on the assigned rank, the base station may then transmit a channel state information reference signal (CSI-RS) with separate sequences for each layer to provide for multi-layer channel estimation. From the CSI-RS, the UE may measure the channel quality across layers and resource blocks. The UE may then transmit a CSI report (including, e.g., CQI, RI, and PMI) to the base station for use in updating the rank and assigning resources for future downlink transmissions.

Hardware Implementation for a Node

Figure 4:
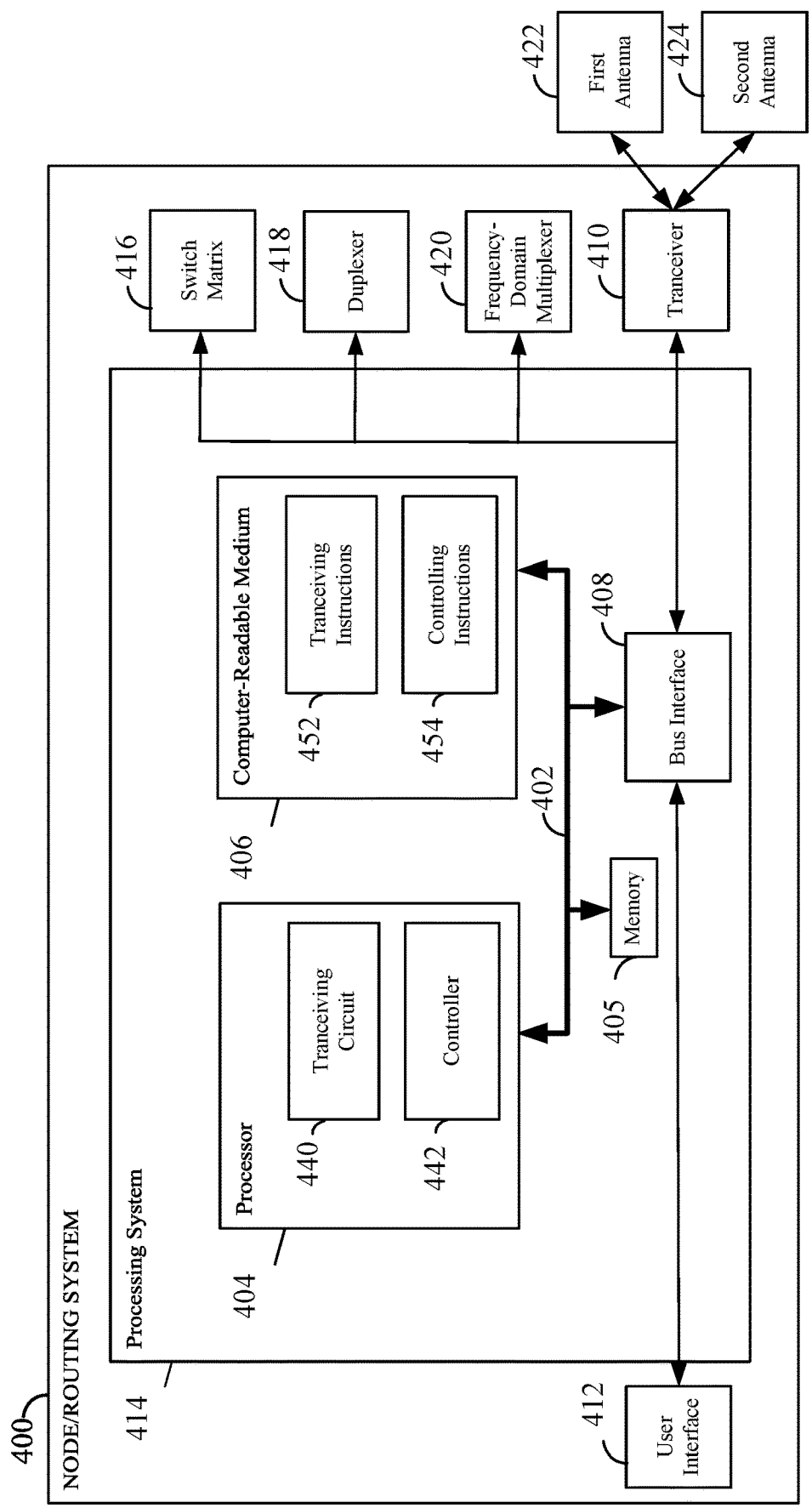
FIG. 4 is a block diagram conceptually illustrating an example of a hardware implementation for a node or routing system according to some aspects of the disclosure.

FIG. 4 is a block diagram illustrating an example of a hardware implementation for a node or routing system 400 employing a processing system 414. For example, the node 400 may be a user equipment (UE) or a base station as illustrated in any one or more of FIGS. 1, 2, and/or 3.

The node 400 may be implemented with a processing system 414 that includes one or more processors 404. Examples of processors 404 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the node 400 may be configured to perform any one or more of the functions described herein. That is, the processor 404, as utilized in a node 400, may be configured (e.g., in coordination with the memory 405) to implement any one or more of the processes and procedures described below and illustrated in FIG. 16.

In this example, the processing system 414 may be implemented with a bus architecture, represented generally by the bus 402. The bus 402 may include any number of interconnecting buses and bridges depending on the specific application of the processing system 414 and the overall design constraints. The bus 402 communicatively couples together various circuits including one or more processors (represented generally by the processor 404), a memory 405, and computer-readable media (represented generally by the computer-readable medium 406). The bus 402 may also link various other circuits such as timing sources, peripherals, voltage regulators, and power management circuits, which are well known in the art, and therefore, will not be described any further. A bus interface 408 provides an interface between the bus 402 and a transceiver 410. The transceiver 410 provides a communication interface or means for communicating with various other apparatus over a transmission medium including a first antenna 422 and/or a first lens antenna 424. The bus interface 408 may further provide an interface between the bus 402 and other components including a switch matrix 416, a duplexer 418, and/or a frequency-domain multiplexer 420. Depending upon the nature of the apparatus, a user interface 412 (e.g., keypad, display, speaker, microphone, joystick) may also be provided. Of course, such a user interface 412 is optional, and may be omitted in some examples, such as a base station.

In some aspects of the disclosure, the processor 404 may include a transceiving circuitry 440 configured (e.g., in coordination with the memory 405 and/or the transceiver 410) for various functions, including, e.g., receiving, from a first antenna 422, first one or more directional beams, and generating first one or more signals corresponding to the first one or more directional beams; transmitting, from a first lens antenna 424, third one or more directional beams corresponding to third one or more signals; receiving, from the first lens antenna 424, fourth one or more directional beams and generating fourth one or more signals corresponding to the fourth one or more directional beams; transmitting, from the first antenna 422, second one or more directional beams corresponding to second one or more signals; receiving, from the first lens antenna 424, fourth one or more directional beams and generating fourth one or more signals corresponding to the fourth one or more directional beams; and/or transmitting, from the first antenna 422, second one or more directional beams corresponding to second one or more signals. For example, the transceiving circuitry 440 may be configured to implement one or more of the functions described below in relation to FIG. 16, including, e.g., blocks 1610, 1616, 1620, and/or 1626.

The processor 404 may further include a controller 442 configured (e.g., in coordination with the memory 405 and/or the transceiver 410) for various functions, including, e.g., controlling the switch matrix; controlling the second switch matrix; communicatively coupling the first one or more signals with the third one or more signals; communicatively coupling the fourth one or more signals with the second one or more signals; and/or communicatively coupling, by a second switch matrix, the first antenna 422 with the first lens antenna 424. For example, the controller 442 may be configured to implement one or more of the functions described below in relation to FIG. 16, including, e.g., blocks 1612, 1614, 1622, and/or 1624.

The processor 404 is responsible for managing the bus 402 and general processing, including the execution of software stored on the computer-readable medium 406. The software, when executed by the processor 404, causes the processing system 414 to perform the various functions described below for any particular apparatus. The computer-readable medium 406 and the memory 405 may also be used for storing data that is manipulated by the processor 404 when executing software.

One or more processors 404 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 406. The computer-readable medium 406 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 406 may reside in the processing system 414, external to the processing system 414, or distributed across multiple entities including the processing system 414. The computer-readable medium 406 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 406 may store computer-executable code that includes transceiving instructions 452 that configure a node 400 for various functions, including, e.g., receiving, from a first antenna 422, first one or more directional beams, and generating first one or more signals corresponding to the first one or more directional beams; transmitting, from a first lens antenna 424, third one or more directional beams corresponding to third one or more signals; receiving, from the first lens antenna 424, fourth one or more directional beams and generating fourth one or more signals corresponding to the fourth one or more directional beams; transmitting, from the first antenna 422, second one or more directional beams corresponding to second one or more signals; receiving, from the first lens antenna 424, fourth one or more directional beams and generating fourth one or more signals corresponding to the fourth one or more directional beams; and/or transmitting, from the first antenna 422, second one or more directional beams corresponding to second one or more signals. For example, the transceiving instructions 452 may be configured to cause a node 400 to implement one or more of the functions described below in relation to FIG. 16, including, e.g., blocks 1610, 1616, 1620, and/or 1626.

The computer-readable storage medium 406 may further store computer-executable code that includes controlling instructions 454 that configure a node 400 for various functions, including, e.g., controlling the switch matrix; controlling the second switch matrix; communicatively coupling the first one or more signals with the third one or more signals; communicatively coupling the fourth one or more signals with the second one or more signals; and/or communicatively coupling, by a second switch matrix, the first antenna 422 with the first lens antenna 424. For example, the transceiving instructions 452 may be configured to cause a node 400 to implement one or more of the functions described below in relation to FIG. 16, including, e.g., blocks 1612, 1614, 1622, and/or 1624.

In one configuration, the node 400 for wireless communication includes a first means for at least one of: receiving first one or more directional beams, generating first one or more signals corresponding to the first one or more directional beams, or transmitting second one or more directional beams corresponding to second one or more signals; a second means for controlling the means communicatively coupled between the first antenna 422 and the first lens antenna 424 for at least one of: communicatively coupling the first one or more signals with the third one or more signals, or communicatively coupling the fourth one or more signals with the second one or more signals; fifth one or more means communicatively coupled between the second lens antenna 424 and the switch matrix for bidirectional communications; third one or more means for communicatively coupling the second lens antenna 424 with the first means for bidirectional communications of the corresponding first one or more signals and the corresponding second one or more signals; fourth one or more means communicatively coupled between the second lens antenna 424 and the first lens antenna for bidirectional communications; fifth one or more means communicatively coupled between the first lens antenna 422 and the first lens antenna for bidirectional communications; sixth means communicatively coupled between the second lens antenna 424 and the first lens antenna 422; seventh one or more means for communicatively coupling the second lens antenna 424 with the corresponding first one or more signals and the corresponding second one or more signals; and/or eighth one or more means communicatively coupling the first lens antenna 422 with the corresponding third one or more signals and the corresponding fourth one or more signals. In one aspect, the aforementioned means may be the processor(s) 404 shown in FIG. 4; the first antenna 702, the first lens antenna 704, and/or the switch matrix 732 shown in FIG. 7; the switch 930, 1350, 1351 for bidirectional communications shown in FIGS. 9 and 13; the SPST switch 1004 shown in FIG. 10; the SPMT switch 1106 shown in FIG. 11; the duplexer 1404-1406, 1414-1417 shown in FIG. 14; the frequency-domain multiplexer 1504, 1506, 1514, 1516 shown in FIG. 15 configured to perform the functions recited by the aforementioned means. In another aspect, the aforementioned means may be a circuit or any apparatus configured to perform the functions recited by the aforementioned means.

Figure 16:
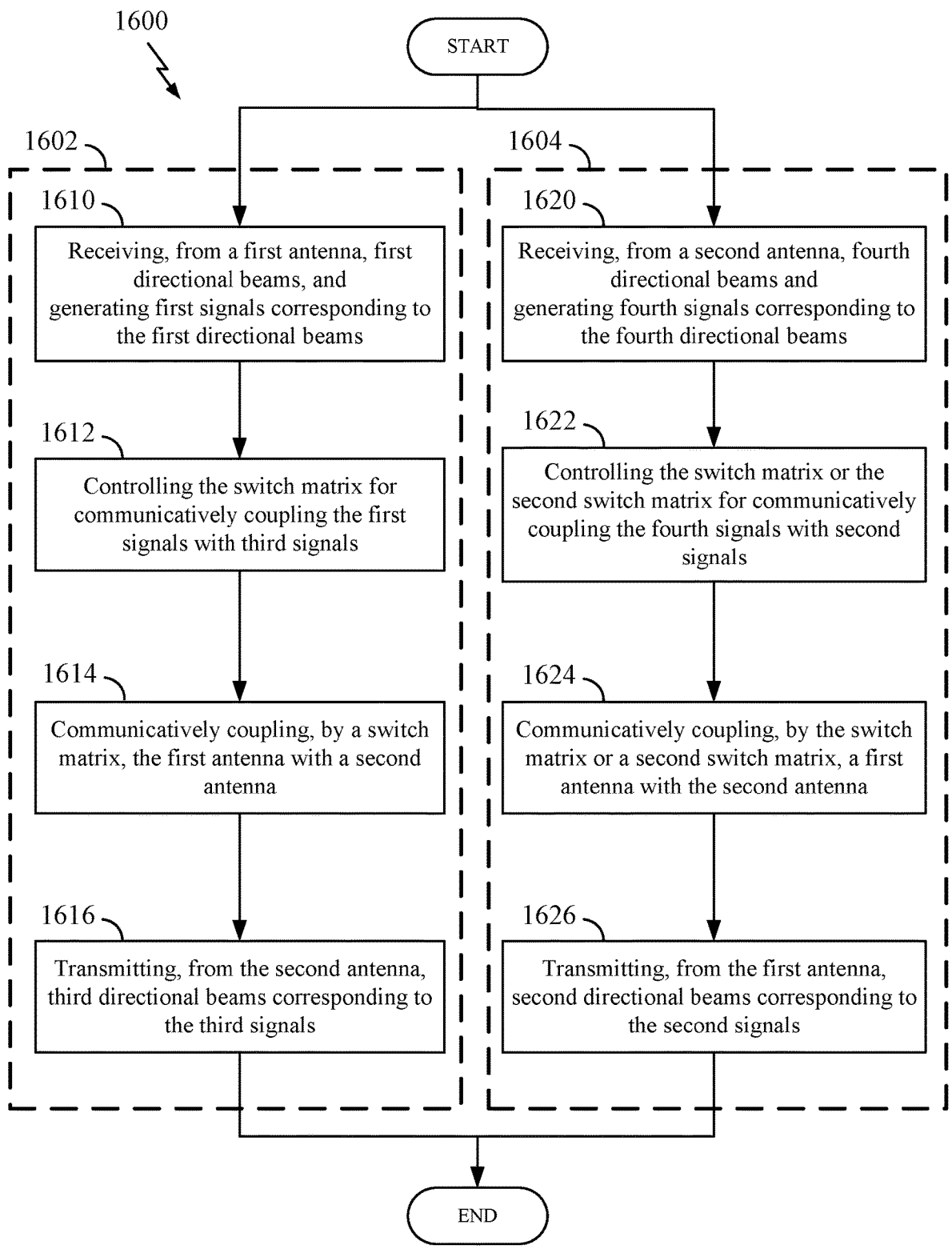
FIG. 16 is a flow chart illustrating an exemplary process for routing beams according to some aspects of the disclosure.

Of course, in the above examples, the circuitry included in the processor 404 is merely provided as an example, and other means for carrying out the described functions may be included within various aspects of the present disclosure, including but not limited to the instructions stored in the computer-readable storage medium 406, or any other suitable apparatus or means described in any one of the FIGS. 1, 2, and/or 3, and utilizing, for example, the processes and/or algorithms described herein in relation to FIG. 16.

mmWave Spectrum

Figure 5:
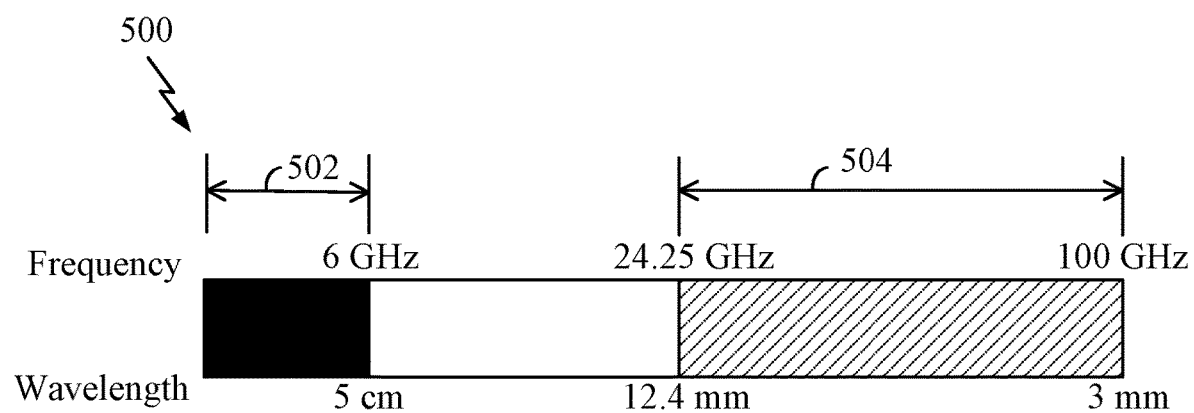
FIG. 5 is a conceptual illustration of frequency ranges for wireless communication.

In 5G NR, at least two frequency ranges are contemplated for wireless communication, as shown in FIG. 5. One is Frequency Range 1 (FR1) 502, which includes frequency bands less than 6 GHz (sub-6 GHz) or wavelengths longer than about 5 cm. The other is Frequency Range 2 (FR2) 504, which includes frequency bands above 24.25 GHz to 52.6 GHz or wavelengths shorter than about 12.5 mm and longer than 5.7 mm. In 5G NR, extension to about 100 GHz or about 3 mm is also contemplated. Thus, frequency bands above 24.25 GHz are referred to as mmWave 504.

The sub-6 GHz frequency spectrum 502 can travel farther and can penetrate objects such as walls better than the mmWave spectrum 504. That is because objects absorb the energy of the high frequency signals in the mmWave spectrum better than the energy in the sub-6 GHz spectrum. Due to these characteristics, the sub-6 GHz spectrum 502 and other low frequency spectra can adequately operate without using routing systems to direct or redirect communication beams, as the mmWave spectrum 504 often does. Such routing systems may include, but are not limited to, nodes, repeaters, routers, relay nodes, integrated access and backhaul (IAB) nodes, and any directional antenna systems.

On the other hand, the mmWave spectrum 504 has wider available bandwidths for high data throughput than the sub-6 GHz spectrum 502 because the mmWave spectrum 504 is a scarcely used spectrum. Thus, the mmWave spectrum 504 is suitable in dense urban areas or crowded indoor environments. However, communications using the mmWave spectrum 504 have high path loss and short range. Physical blockers such as a human body and walls often limit coverage. Due to this high path loss, the mmWave spectrum 504 is in a noise-limited regime, which may not need any interference management mechanism. However, the mmWave spectrum 504 may involve secondary or supplementary line-of-sight (LOS) channels between a gNB and UE, e.g., through routing systems. In the meantime, routing systems may support wideband signals because one of the features in 5G NR is wideband signaling. In addition, routing systems may support multi-band signals because the directional antenna systems can transmit and receive signals on multiple frequencies at the same time from a single cell (carrier aggregation) or two cell groups (dual connectivity). For example, routing systems may receive and/or transmit sub-6 GHz spectrum signals and at the same time mmWave spectrum signals.

Lens Antenna

For mmWave communications, lens antennas may support wideband beamforming through true-time-delay shifting (TTD) and at the same time have good port-to-port isolation. A lens antenna based on a focusing scheme may achieve a high directional gain in an antenna beam. Lens antennas may produce one or more collimated beams. A collimated beam is a unidirectional plane wave of finite width without divergence. In addition, lens antennas may steer multiple beams simultaneously without phase-shifters or combiners and provide improved isolation between antenna ports, as compared to conventional antenna systems. At the same time, lens antennas may support wideband/multi-band signaling. Further, available technologies such as optical meta-surfaces, 2-D planar architectures, or small apertures for the mmWave spectrum may reduce the size, weight, and manufacturing cost of a lens antenna.

Figure 6:
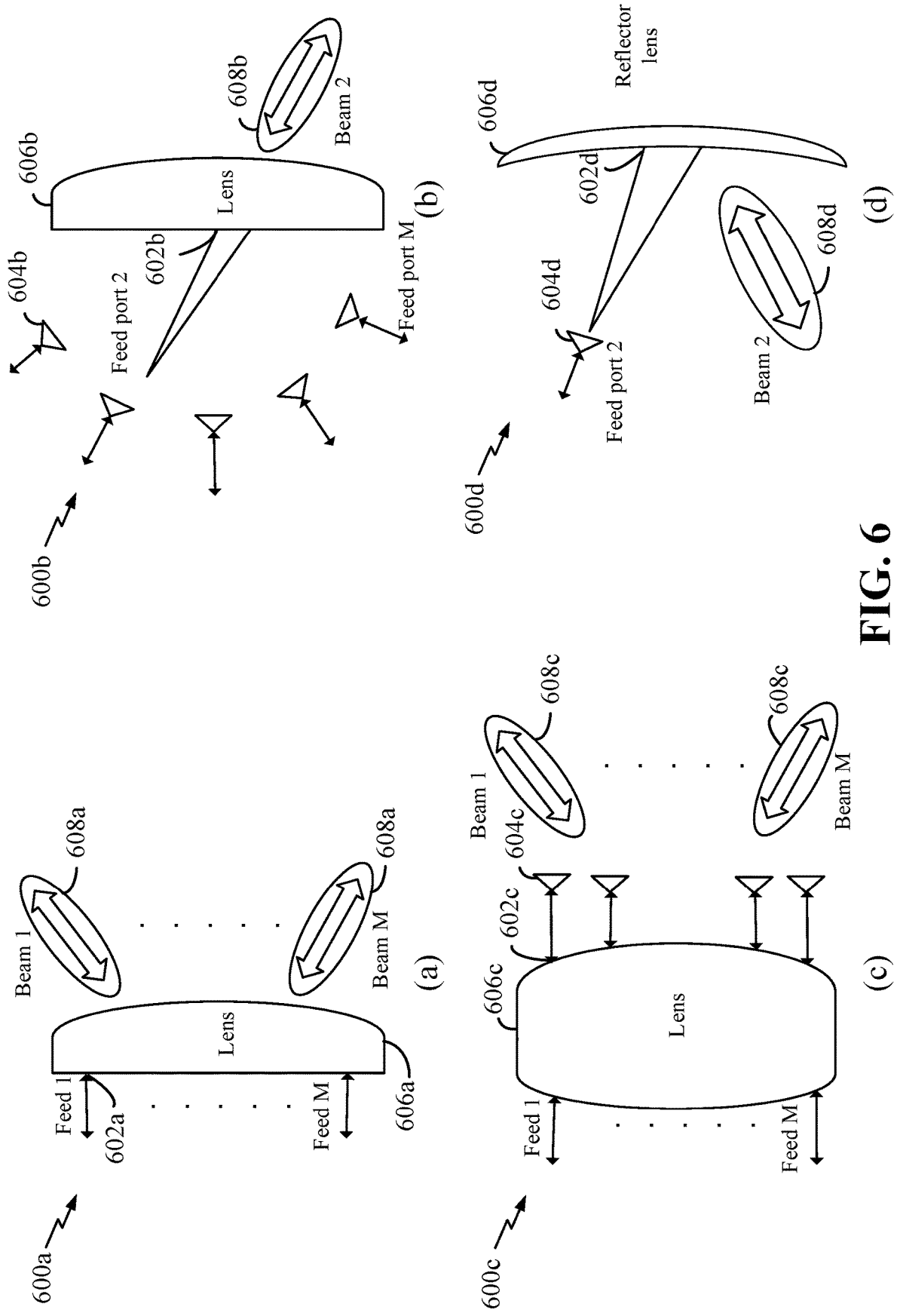
FIG. 6 is a schematic illustration of examples of multi-beam lens architectures according to some aspects of the disclosure.

FIG. 6 illustrates some examples of multi-beam lens architectures. FIGS. 6(a)-6(d) show a lens antenna system 600a-600d including a lens antenna 606, which includes antenna ports 602. The lens antenna 606 may be a Luneburg lens or a Rotman lens. However, the lens antenna 606 may be any other suitable type of lens antenna to support beamforming. The lens antenna system 600a may be able to transmit and receive multiple beams. When the lens antenna system 600a receives multiple beams 608a, the multiple beams 608a may arrive at a surface of lens 606a at different angles. Each beam 608a may include a plurality of parallel waves of radiation. The geometry and refractive properties of the lens 606a may cause the plurality of parallel waves for each beam 608a to travel to a respective focal point on the opposite side of the lens 606a. The lens 606a multiplexes the plurality of parallel waves for each beam and generates a respective signal from a respective port 602a corresponding to a focal point. Thus, lens 606a may receive multiple beams 608a at different angles and may generate corresponding signals from corresponding ports 602a. When the lens antenna system 600a transmits multiple beams 608a, the operating mechanism of the lens 606a is the same as the reception of multiple beams 608a, but the direction of beams and signals is opposite. The lens 606a may perform physical beamforming by refracting each beam to be directed in a specific direction 608a. In some examples, the lens 606a may not only rely on the characteristics of conventional optics. For example, a lens 606a may also scatter and steer beams by using dielectric nanoparticles in optical meta-surfaces. And in some examples, the lens antenna system 600a may receive or transmit multiple beams 608a at the same time. A directional antenna 604b may be in use to transmit or receive beams through the lens 606 in a specific direction as shown in FIG. 6(b). The directional antenna 604b may be any directional antenna. It may include, but is not limited to, an antenna panel with an array of antenna elements, multiple directional antennas or another lens antenna. The directional antenna 604 may transmit or receive beams using planar antenna elements without phase shifters as shown in FIG. 6(c). The lens 606 in the lens antenna system 600 may be a reflector lens 606 as shown in FIG. 6(d). The reflector lens 606 may reflect multiple beams 608 to specific directions by changing or fixing the degree of the outer lens contour. It should be appreciated that the types of lens antenna architectures are not limited to lens antennas of FIGS. 6(a)-6(d). It could be any suitable type of lens antenna if the lens antenna 606 can physically steer multi-beams to specific directions.

Lens antennas may be applicable to various areas. For example, lens antennas may be in use for, but are not limited to, inter-connecting gNBs, mobile UEs, integrated access and backhaul nodes, and small cells and back-hauls' links for 5G NR. Lens antennas may be exploited in ad-hoc cellular V2X (C-V2X) multicast to communicatively couple a gNB with pedestrians, vehicles, and roadside units. Also, lens antennas may be used in a multi-hop multi-point backhaul radio system at an unlicensed spectrum for street-level deployment. Lens antennas may be implemented in multi-person augmented reality (AR)/virtual reality (VR) game-stations and headsets. Lens antennas may further be used in aerial routers to communicatively couple multiple gNBs with multiple UEs in remote areas where fixed-link backhaul is infeasible. In addition, lens antennas may communicatively couple low-earth-orbit satellites with earth-stations, which requires agile beam-scanning and beam-switching. It should be appreciated that the listed lens antenna applicable areas are merely examples and the applicable areas are not limited to those above.

Routing System

Figure 7:
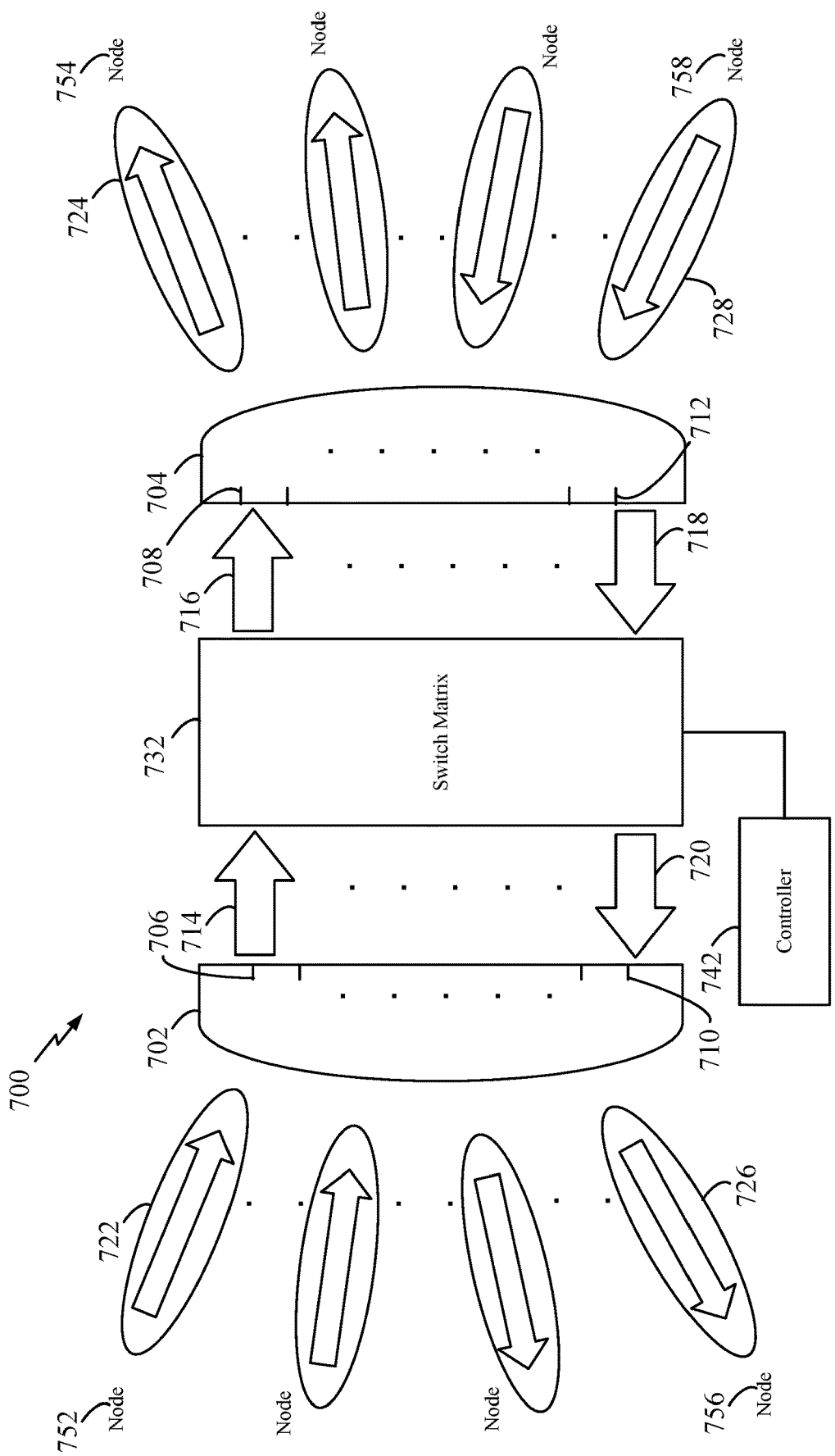
FIG. 7 is a schematic illustration of an exemplary routing system or node using at least one lens antenna according to some aspects of the disclosure.

Using a lens antenna, FIG. 7 illustrates an exemplary routing system or node 700 according to some aspects of this disclosure. Here, routing may indicate directing or redirecting one or more beams to another one or more beams in the same or different directions. The routing system 700 using at least one lens antenna may have several advantages. For example, the routing system 700 may make a secondary line-of-sight channel between a transmitter 302 and a receiver 306 shown in FIG. 3 if a direct line-of-sight channel between them may not be established. In addition, the routing system 700 may be able to communicatively couple multiple nodes 752, 756 with another multiple nodes 756, 758 simultaneously. For example, the system 700 may direct or redirect multiple incoming beams 722 from multiple nodes to outgoing beams 724 to another multiple nodes. Further, the routing system 700 may unidirectionally or bidirectionally direct or redirect multiple incoming beams 722 from nodes to outgoing beams 724 to other nodes. In addition, the routing system 700 may support wideband beamforming in the mmWave spectrum due to characteristics of the lens antenna. The directions of incoming beams 722 may be the same as or different from those of outgoing beams 724. The system 700 may direct or redirect one incoming beam 722 to one outgoing beam 724 or multiple outgoing beams 724. That is, the system 700 may communicatively couple one node with one other node or multiple nodes. The advantages are not limited to those above. A person having ordinary skill in the art would appreciate any other advantage using the routing system 700.

The routing system or node 700 may include a first antenna 702, a first lens antenna 704, a switch matrix 732, and a controller 742. The routing system 700 may direct or redirect first one or more directional beams 722 to third one or more directional beams 724 in a unidirectional way. Each of the first one or more directional beams 722 may come from a different direction. Each of the first one or more directional beams 722 may include a plurality of parallel waves. The plurality of parallel waves corresponding to a beam arrives to a focal point. The first antenna 702 may multiplex the plurality of parallel waves and generate a signal from a port 706 corresponding to the focal point. The first antenna 702 may receive the first one or more directional beams 714, and generate first one or more signals 714 from corresponding antenna ports 706 of the first antenna 702. The first one or more signals 714 may correspond to the first one or more directional beams 722. Each of the first one or more signals 714 may also correspond to a respective antenna port 706 in the first antenna 702 and a respective beam of the first one or more beams. Then, the first antenna 702 may transmit, send, or provide the first one or more signals 714 to the switch matrix 732.

A switch matrix 732 may communicatively couple the first antenna 702 and the first lens antenna 704. In particular, the switch matrix 732 may communicatively couple each of antenna ports 706 of the first antenna 702 with each of antenna ports 708 of the first lens antenna 704. Thus, the switch matrix 732 may communicatively couple the first one or more signals 714 with third one or more signals 716. The switch matrix 732 may communicatively couple each of the first one or more signals 714 with one or multiple signals of the third one or more signals 716. Each of the third one or more signals 716 may correspond to a respective port of the antenna ports 708 of the first lens antenna 704.

The controller 742 may control the switch matrix 732 for communicatively coupling the first one or more signals 714 with the third one or more signals 716 to steer the first one or more beams 722 from the one or more APs or UEs to one or more UEs where the one or more third beams 724 arrive. The controller 742 may control the switch matrix 732 based, e.g., on one or more of: one or more second nodes' locations to transmit the second or third one or more beams 724, second or third one or more nodes' reference signals, historical routing, or one or more controlling signals from a base station. However, it should be appreciated that the controller 742 may consider any other suitable parameter to control the switch matrix 732. The controller 742 may receive a control signal, e.g., from a base station. The base station may transmit the control signal to the routing system 700, e.g., using a wired backhaul. However, it should be appreciated that the transmission should not be limited to a wired backhaul. For example, the transmission could be made through wireless communications channels using the sub-6 GHz spectrum, the mmWave spectrum, or any other frequency spectra. The controller 742 may also control radio frequency components in the routing system 700. The radio frequency components may include, but are not limited to, a low-noise amplifier (LNA), power amplifier (PA), switch, and/or other devices. In addition, the controller 742 may control remote configuration of the routing system 700.

The first lens antenna 704 may receive the third one or more signals 716 from the switch matrix 732 on corresponding antenna ports 708 of the first lens antenna 704. The first lens antenna 704 may demultiplex each of the third one or more signals 716 and generate a plurality of parallel waves in a predetermined direction due to the geometry and refractive properties of the lens antenna 704. The plurality of parallel waves for each of the third one or more signals 716 may correspond to a respective beam of the third one or more beams 724. Thus, the first lens antenna 704 may generate third one or more directional beams 724 corresponding to the third one or more signals 716 and transmit the third one or more directional beams 724 to third one or more nodes 754. Each of the third one or more signals 716 may correspond to a respective antenna port in the first lens antenna 704 and a respective beam of the third one or more beams 714. Due to predetermined lens antenna configurations, the first lens antenna 704 may transmit, from each antenna port 708 of the first lens antenna 704, a respective beam of the third one or more beams 724 to a specified direction.

Additionally, the routing system 700 may route beams in a bidirectional and simultaneous way. For example, the routing system 700 may direct or redirect the first one or more beams 722 from the first one or more nodes 752 to the third one or more nodes 754 to which the third one or more beams 724 arrive. At the same time, the routing system 700 may also direct or redirect fourth one or more directional beams 728 from fourth one or more nodes 758 to second one or more nodes 756 to which second one or more directional beams 726 arrive. The first lens antenna 704 may receive the fourth one or more directional beams 728 and generate corresponding fourth one or more signals 718 from corresponding antenna ports 712 of the first lens antenna 704. The fourth one or more signals 718 may correspond to the fourth one or more directional beams 728. The first lens antenna 704 may receive the fourth one or more directional beams 728 and at the same time may transmit the third one or more directional beams 724. Then, the first lens antenna 704 may transmit, send, or provide the fourth one or more signals 718 to the switch matrix 732.

A switch matrix 732 may communicatively couple the first lens antenna 704 and the first antenna 702. In particular, the switch matrix 732 may communicatively couple each of antenna ports 712 of the first lens antenna 704 with each of antenna ports 710 of the first antenna 702. Thus, the switch matrix 732 may communicatively couple the fourth one or more signals 718 with second one or more signals 720 while the switch matrix 732 may communicatively couple the first one or more signals 714 with the third one or more signals 716. The switch matrix 732 may communicatively couple each of the fourth one or more signals with each of the second one or more signals 720. The switch matrix 732 may communicatively couple each of the fourth one or more signals 718 with one or multiple signals of the second one or more signals 720.

The controller 742 may also control the switch matrix 732 for communicatively coupling the fourth one or more signals 718 with the second one or more signals 720 to steer the fourth one or more beams 722 to second one or more nodes 756 where second one or more beams 726 arrive. The controller 742 may control the switch matrix 732 based on one or more, e.g., APs' or UEs' locations to receive the second one or more beams 728, one or more APs' or UEs' reference signals, historical routing, or one or more controlling signals from a base station. However, it should be appreciated that the controller 742 may consider any other suitable parameter to control the switch matrix 732.

The first antenna 702 may receive the second one or more signals 720 from the switch matrix 732. Then, the first antenna 702 may generate second one or more directional beams 726 corresponding to the second one or more signals 720 and transmit the second one or more directional beams 726 to the second one or more nodes 756. Each of the second one or more signals 716 may correspond to a respective antenna port in the first antenna 702 and a respective beam of the second one or more beams 726. Thus, the routing system 700 may direct or redirect a set of beams 722 or 728 from one or more nodes 752 or 758 to a different set of beams 724 or 726 to one or more nodes 754 or 756 in a unidirectional or bidirectional way.

Unidirectional Routing System with One Lens Antenna

Figure 8:
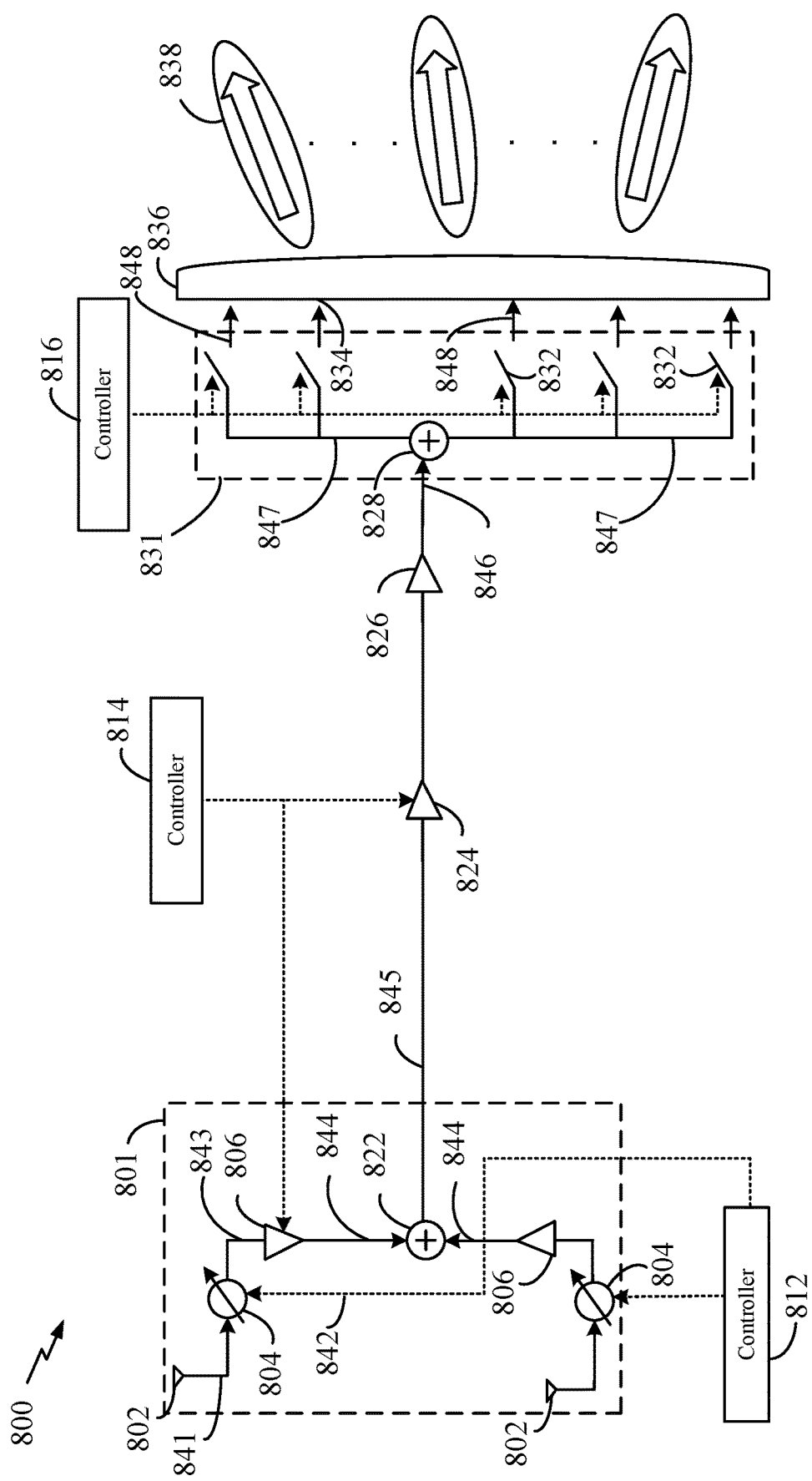
FIG. 8 is a schematic illustration of an exemplary unidirectional routing system or node according to some aspects of the disclosure.

FIG. 8 illustrates an exemplary unidirectional routing system 800 according to a further aspect of this disclosure. The routing system 800 may include a first antenna 801, a first lens antenna 836, a switch matrix 831, and a controller 812 and 816. The first antenna 801 may receive a directional beam from a node. The first antenna 801 may generate a signal 845 corresponding to the directional beam. The switch matrix 831 may communicatively couple the signal 845 with one or more signals 848. The controller 816 may control the switch matrix 831 for the coupling. Then, the first lens antenna 836 may transmit one or more directional beams 838 corresponding to the one or more signals 848 in specific directions to one or more nodes. Thus, the routing system 800 may be unidirectional.

The first antenna 801 may include a phased array 802. The phased array 802 may include a group of antenna elements 802 to work together to receive the beam in a specific direction from the node. The phased array 802 may receive a plurality of waves of radiation, which constitute the beam. The routing system 800 may determine where the node transmits the beam based on the received waves of radiation 841. Then, the phase shifters 804 may change phase of the waves 841 to line up with one another in time based on a control signal 842 from the controller 812. The phase shifted waves 843 may pass through low-noise amplifiers (LNAs) 806. The gain controller 814 may control power gains to the LNAs 806 to make the weak signals 843 strong without introducing substantial noise or distortion to the signals 843. The power combiner 822 may combine the signals 844 from LNAs 806 and generate a signal 845 corresponding to the received beam. The power combiner 822 may be a Wilkinson power combiner 822. A Wilkinson power combiner 822 may combine several equal phase input signals into one signal. The Wilkinson power combiner 822 may be a power divider as well to divide an input signal into several equal amplitude and equal phase output signals at the same time because as a passive component, the power divider is reciprocal. The Wilkinson power combiner 822 is a mere example to combine signals 844. It should be appreciated that any other type of power combiner may be in use to combine the amplified signals 844 and generate one signal 845. Thus, the first antenna 801 may receive a beam and generate the signal 845 corresponding to the beam. The signal 845 may travel through the PA 824 and the PA 826 to amplify the power of the signal 845 considering target transmitting power at the first lens antenna 836. The gain controller 814 may control the power gain of the PA driver 824 to amplify the power of the signal 845.

The switch matrix 831 may receive the amplified signal 846. The switch matrix 831 may communicatively couple the first antenna 801 with the first lens antenna 836. In particular, the switch matrix 831 may communicatively couple the signal 845 from the first antenna 801 with one or more antenna ports 834 in the first lens antenna 836. The switch matrix 831 may include a power divider 828 and one or more switches 832. The power divider 828 may divide the amplified signal 846 into equal phase signals 847. The controller 816 may control the switch matrix 831 to communicatively couple the signal 846 with the one or more signals 848. Thus, although the switch matrix 831 may communicatively couple the signal 845 with each of one or more antenna ports 834, some divided signals 847 might not reach the corresponding antenna ports 834 in the first lens antenna 836. The controller 816 may control switches 832 to determine which signals 847 the controller 816 transmits to the first lens antenna 836. The switch 832 may be a single pole single throw (SPST) switch. However, the switch 832 may be any other suitable type of switch or radio frequency component to connect or disconnect the circuit between the power divider 828 and the antenna port 834. The switch 832 may either be closed or disconnected. If the switch 832 is closed, a divided signal 847 may travel to the antenna port 834 of the first lens antenna 836 through the closed switch 832. On the other hand, if the switch 832 is open, the divided signal 847 may not travel to the antenna port 834 of the first lens antenna 836.

The physical location of each antenna port 834 of the lens antenna 836 may determine the direction of the respective beam 838 to be transmitted. Unlike the phased array 802, the lens antenna 836 does not need a set of phase shifters 804 for beamforming. The one or more antenna ports 834 of the lens antenna 836 may receive the one or more signals 848. Then, the lens antenna 836 may generate one or more beams 838 corresponding to the one or more signals 848. The lens antenna 836 may transmit the one or more beams 838 to specific directions, which are determined by the convergence or divergence properties of the lens antenna 836.

Bidirectional Routing System with One Lens Antenna

Figure 9:
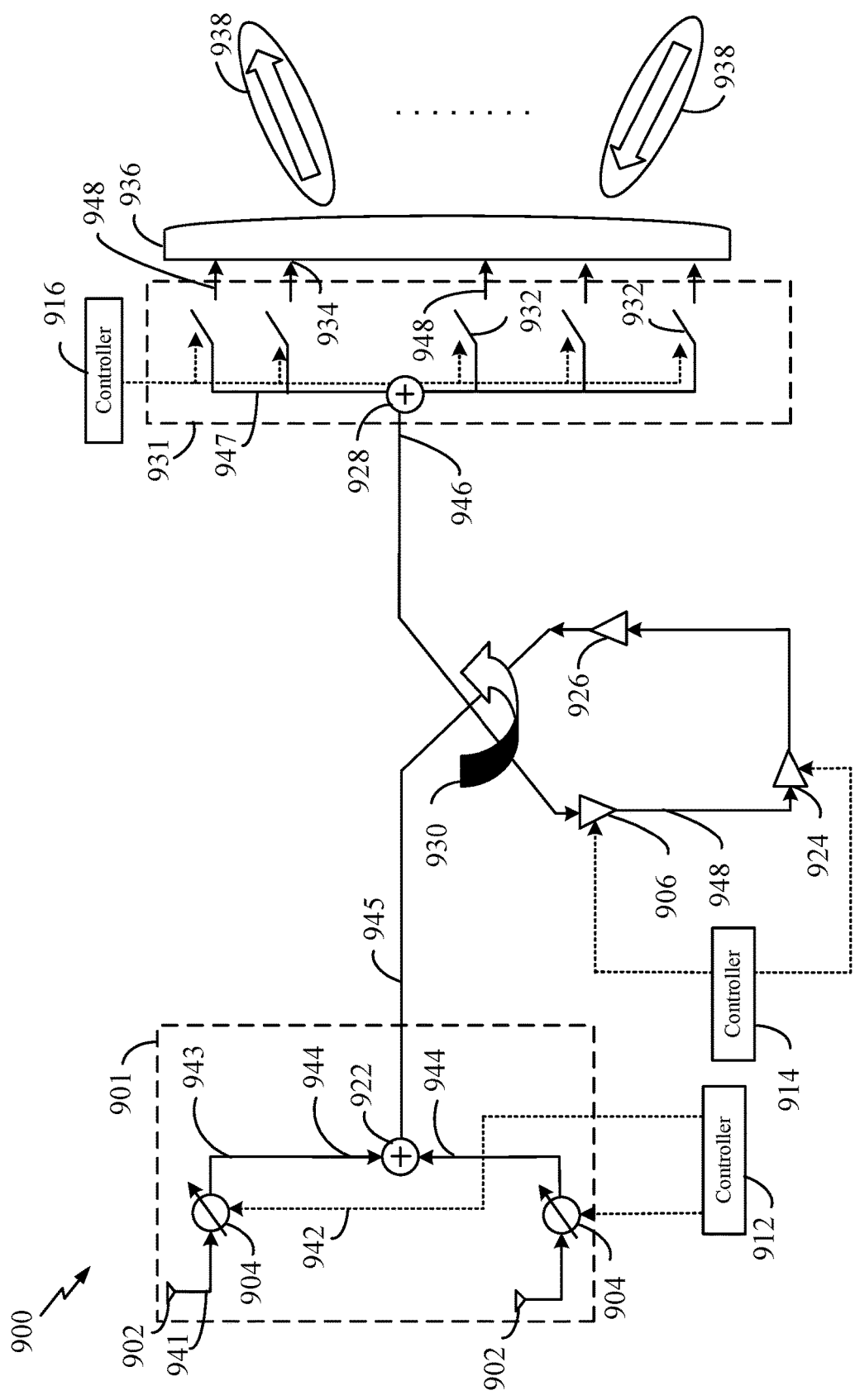
FIG. 9 is a schematic illustration of an exemplary bidirectional routing system or node according to some aspects of the disclosure.

FIG. 9 illustrates an exemplary bidirectional routing system 900 according to a further aspect of this disclosure. The bidirectional routing system 900 may include the same components as the unidirectional routing system 800 illustrated in FIG. 8. The same components may include a first antenna 901, a first lens antenna 936, a switch matrix 931, and a controller 912 and 916. The same components may function in the same way as those in the unidirectional routing system 800. The bidirectional routing system 900 may exploit the same first antenna 901, the first lens antenna 936, and the switch matrix 931 as the unidirectional routing system 800 for bidirectional communications because those components are passive and reciprocal.

In addition, the bidirectional routing system 900 may further include a switch 930 communicatively coupling the phased array 901 with the switch matrix 931 for bidirectional communications. For example, the switch 930 for the bidirectional communications may include a double pole double throw (DPDT) switch 930, which has two inputs and four outputs. However, the switch 930 may not be limited to the DPDT switch. The switch 930 may be any suitable type of radio frequency component, which allows bidirectional communications. For one communications direction, the combined signal 946 may travel to the LNA 906 through the DPDT switch 930, which allows the one communications direction. The gain controller 914 may control a power gain to the LNA 906 to make the weak signal 946 strong without introducing noise or distortion to the signal 946. The PA driver 924 and the PA 926 may amplify the power of the signal 948 to target transmitting power in the first antenna 901. The PA driver 924 may amplify the power of the signal 948 based on the power gain controlled by the gain controller 914. The amplified signal 945 may travel to the first antenna 901. On the other hand, another signal 945 from the first antenna 901 may travel to the first lens antenna 936 through the DPDT switch 930 as well. The DPDT switch 930 may exploit another switch configuration for the signal 945 to travel to the first lens antenna 936. The signal 945 may pass through the same or different LNA 906 to amplify the weak power signal 945 and through the same or different PA driver 924 and PA 926 to amplify the power of the signal 948 to target transmitting power in the first lens antenna 936. Then, the amplified signal 946 travels to the first lens antenna 936.

Like the unidirectional routing system 800, the first antenna 901 may receive a first beam from a first node and generate a first signal 945 corresponding to the first beam. Unlike the phased array 902, the lens antenna 936 does not need a set of phase shifters 904 for beamforming. The first signal 945 may travel to the first lens antenna 936 through the DPDT switch 830 as described above. Then, the switch matrix 931 may receive the first signal 945 and produce third one or more signals 948 to the first lens antenna 936. The first lens antenna 936 may transmit third one or more directional beams 938 corresponding to the third one or more signals 948 to third one or more nodes.

Further, the first lens antenna 936 may receive fourth one or more directional beams 938 from fourth one or more nodes and generates fourth one or more signals 948 corresponding to the fourth one or more directional beams 938. The switch matrix 931 may receive the fourth one or more signals 948. The switch matrix 931 may communicatively couple the first antenna 901 with the first lens antenna 936. The controller 916 may control the switch matrix 931 for communicatively coupling the fourth one or more signals 948 with the second signal 945. The switch matrix 931 may perform the coupling using the power combiner 928 and one or more switches 932. The power combiner 928 may combine the fourth one or more signals 947 coming through the closed switches 932. The power combiner 928 may combine the fourth one or more equal-phase signals 947 into the second signal 946. The power combiner 928 may function as a power divider 928 when the routing system 900 receives the first beam and transmits the third one or more beams 938 to the third one or more nodes. The combined second signal may travel to the first antenna through the DPDT switch 930 as described above.

The first antenna 901 may receive the amplified second signal 945 and generate the second beam corresponding to the amplified second signal 945. The first antenna 901 may transmit the second beam to a second node. In particular, the amplified second signal 945 may travel to the power divider 922. The power divider 922 may be the Wilkinson power divider to divide the second signal 945 into several equal phase signals 943. The phase shifters 904 may shift phase of the divided signals 943 to form the second beam in a specific direction to the second node. Then, the phased antenna 902 may transmit the second beam to the specific direction where the second node is.

Switch Matrix for Routing Systems Using Two Lens Antennas

The exemplary routing systems elaborated in FIGS. 8 and 9 may exploit a phased array 802 and 902 and a lens antenna 836 and 936 for routing a beam to one or more beams and/or one or more beams to a beam. In different circumstances, exemplary routing systems illustrated in FIGS. 12-15 utilize two lens antennas for routing first one or more beams to third one or more beams in one direction and/or fourth one or more beams to second one or more beams in a different direction. Due to their multi-beam routing systems, the exemplary routing systems shown in FIGS. 12-15 may use exemplary switch matrixes shown in FIGS. 10-11.

Figure 10:
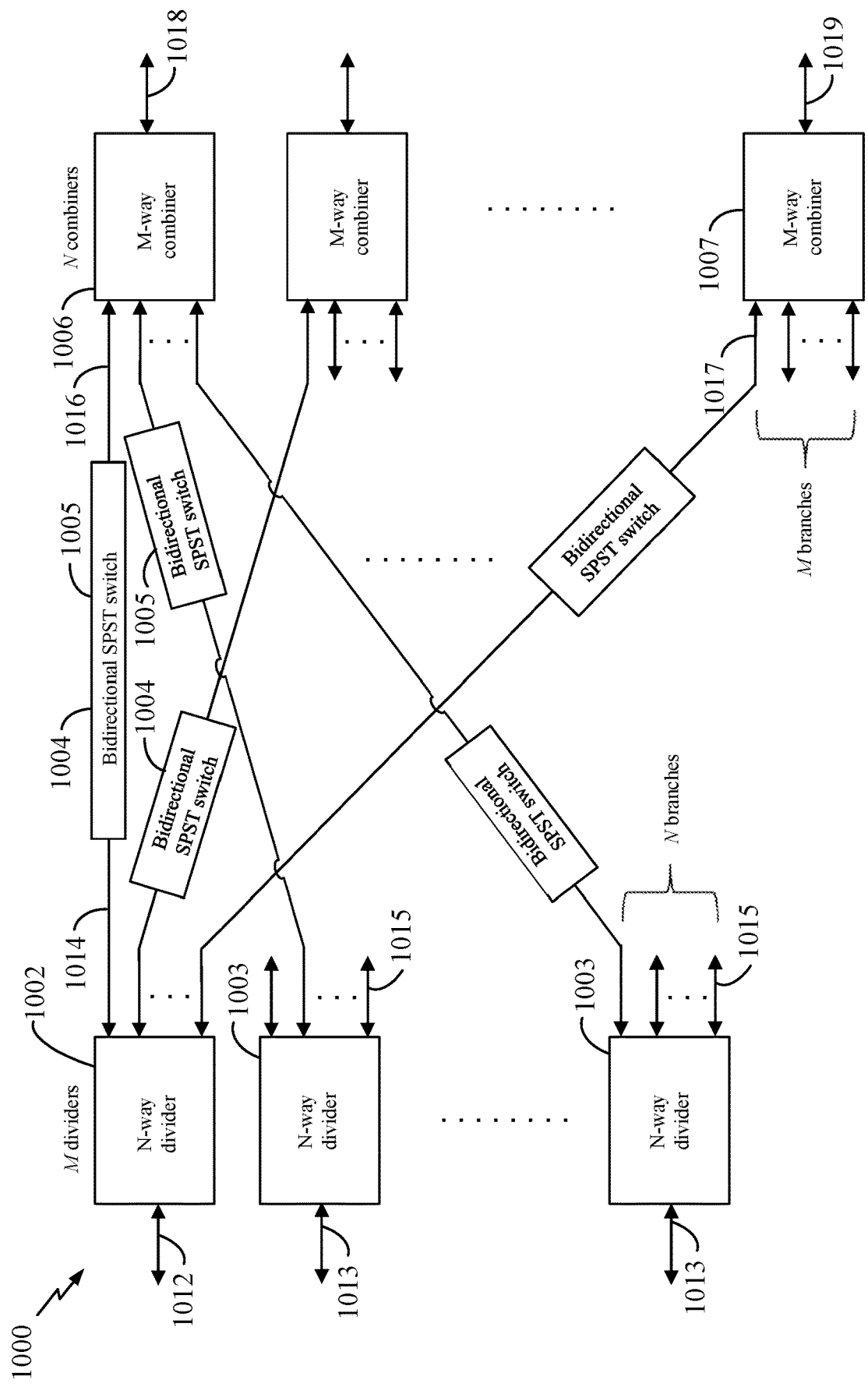
FIG. 10 is a schematic illustration of an exemplary switch matrix in a routing system or node according to some aspects of the disclosure.

FIG. 10 illustrates an exemplary switch matrix 1000 according to some aspects of the disclosure. As shown, the switch matrix 1000 communicatively coupling the first antenna receiving first one or more beams or transmitting second one or more beams with the first lens antenna transmitting third one or more beams or receiving fourth one or more beams. For one communications direction, the switch matrix 1000 may receive first one or more signals 1012 corresponding to the first one or more beams from the first antenna, communicatively couple the first one or more signals 1012 with third one or more signals 1018, and transmit the third one or more signals 1018 corresponding to the third one or more beams to the first lens antenna. The switch matrix 1000 may communicatively couple each of the first one or more signals 1012 with each of the third one or more signals 1018.

For example, the first antenna may have M antenna ports to receive M first beams or transmit M second beams, and the first lens antenna may have N antenna ports to transmit the N third beams or receive the N fourth beams. M antenna ports of the first antenna may be communicatively coupled with corresponding M first power dividers 1002, 1003 of the switch matrix 1000. Each first power divider 1002, 1003 may communicatively couple a respective antenna port of the first antenna with each of N first power combiners 1006, 1007. The first power divider 1002, 1003 may be a N-way Wilkinson divider to communicatively couple a signal from an antenna port of the first antenna with every first power combiner 1006, 1007 (N power combiners). However, it should be appreciated that the first power divider 1002, 1003 is not limited to a Wilkinson divider. The first power divider 1002, 1003 may be any suitable type of power divider, which may divide a signal into N equal phase signals. A respective switch 1004 may communicatively couple each first power divider 1002, 1003 with each first power combiner 1006, 1007. The switch 1004 may be a bidirectional single pole single throw (SPST) switch to connect or disconnect a signal 1014 to another signal 1016. A controller may control the one or more switches 1004 to communicatively couple a first power divider 1002, 1003 with a set of the second power combiners 1006, 1007.

In particular, first signal 1 (1012) of the first one or more signals may communicatively couple a respective antenna port of the first antenna with first power divider 1 (1002). The first power divider 1 (1002) may divide the first signal 1 (1012) into N signals 1014 and may communicatively couple the first signal 1 (1012) with N first power combiners 1006, 1007. N switches 1004 may communicatively couple the first power divider 1 (1002) with the corresponding N first power combiners 1006, 1007. Similarly, first power divider M (1003) may divide first signal M (1013) into N signals 1015 and may communicatively couple the first signal M (1013) with N first power combiners 1006, 1007. N switches 1004 may communicatively couple the first power divider M (1003) with corresponding N first power combiners 1006, 1007. The controller may control each switch 1004 to communicatively couple a respective divided signal 1014, 1015 with a respective first power combiner 1006, 1007. Thus, the controller may control, using the one or more switches 1004, coupling each of the first one or more signals 1012, 1013 with some or all of the first power combiners 1006, 1007. Thus, the switch matrix 1000 may communicatively couple the first one or more signals 1012, 1013 with the third one or more signals 1018, 1019. Since the first lens antenna transmits the third one or more beams corresponding to the third one or more signals, the controller may control the one or more switches 1004 to direct the first one or more beams to the third one or more beams. The one or more first power combiners 1006, 1007 may combine a set of signals 1015, 1016 from the one or more first power dividers 1002, 1003 into the third one or more signals 1018, 1019. A first power combiner 1006 may receive a single signal 1016 from a first power divider 1002 or multiple signals from multiple first power dividers 1002, 1003 and generate a combined signal 1018 of the third one or more signals 1018, 1019.

For bidirectional communications, the switch matrix 1000 may further receive fourth one or more signals 1018 corresponding to the fourth one or more beams from the first lens antenna, communicatively couple the fourth one or more signals 1018 with second one or more signals 1012, and transmit the second one or more signals 1012 to the first antenna. The second one or more signals may correspond to the second one or more beams. The switch matrix 1000 may communicatively couple each of the fourth one or more signals 1012 with each of the second one or more signals 1018.

For bidirectional communications, the switch matrix 1000 may exploit the same first power dividers 1002, 1003, switches 1004, and first power combiner 1006, 1007 as illustrated above for a communications direction in the switch matrix 1000 because those components are passive and reciprocal. However, for a different communications direction where the first lens antenna receives the fourth one or more beams and the first antenna transmits the second one or more beams, the first power dividers 1002, 1003 may function as second power combiners 1002, 1003, and the first power combiners 1006, 1007 may operate as second power dividers 1006, 1007 due to the different communications direction. Further, the controller may control the one or more switches 1005 to communicatively couple the second power dividers 1006, 1007 with a set of the second power combiners 1002, 1003.

After receiving the fourth one or more beams from the corresponding antenna ports of the first lens antenna, the first lens antenna may generate fourth one or more signals 1018, 1019 corresponding to the fourth one or more beams. The second power divider 1 (1006) may divide fourth signal 1 (1018) into M signals 1016 and may communicatively couple the fourth signal 1 (1018) with M second power combiners 1002, 1003. The second power divider N (1007) may divide fourth signal N (1018) into M signals 1017 and may communicatively couple the fourth signal N (1018) with M second power combiners 1002, 1003. The controller may control each of the one or more switches 1005 to communicatively couple a respective divided signal 1016, 1017 with a respective second power combiner 1002, 1003. Thus, the controller may control, using the one or more switches 1005, coupling each of the fourth one or more signals 1016, 1017 with some or all of the second power combiners 1002, 1003. That is, the switch matrix 1000 may communicatively couple the fourth one or more signals 1018, 1019 with the second one or more signals 1012, 1013. Since the first antenna transmits the second one or more beams corresponding to the second one or more signals 1012, 1013, the controller may control the one or more switches 1005 to direct the fourth one or more beams to the second one or more beams. The second power combiners 1002, 1003 may combine a set of signals 1014, 1015 from the second power dividers 1006, 1007 into the second one or more signals 1012, 1013. A second power combiner 1002 may receive a single signal 1014 from a second power divider 1006, 1007 or multiple signals from multiple second power dividers 1006, 1007 and generate a combined signal 1012 of the third one or more signals 1012, 1013.

Figure 11:
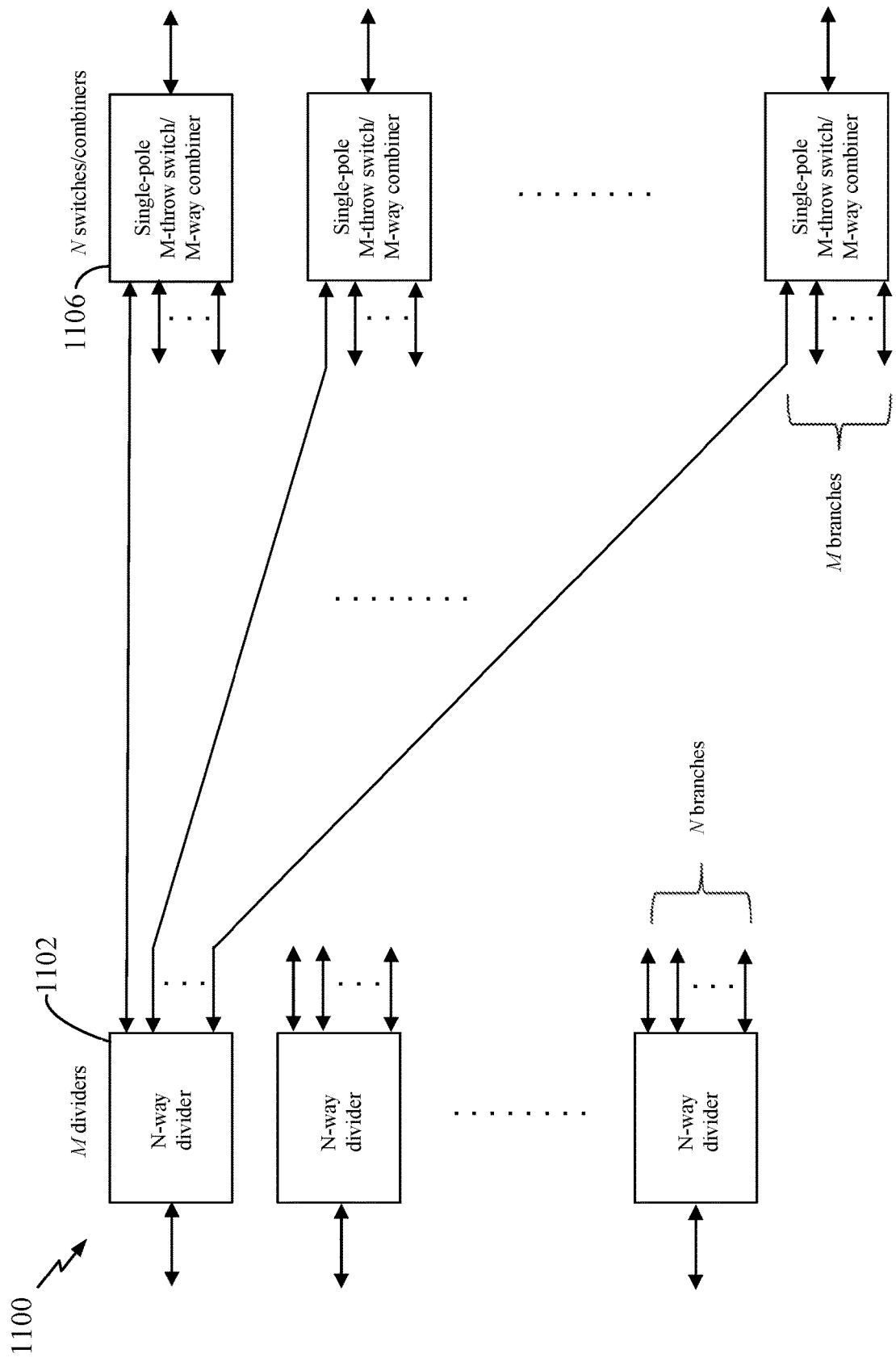
FIG. 11 is a schematic illustration of another exemplary switch matrix in a routing system or node according to some aspects of the disclosure.

FIG. 11 illustrates another exemplary switching matrix 1100 according to some aspects of the disclosure. The switching matrix 1100 may use a single pole M throw switch 1106 in a combiner 1106 rather than a SPST switch in the switching matrix 1000 between a divider and a combiner shown in FIG. 10. That is, a combiner whose arms are individually controllable and can be individually switched on and off. The combiner 1106 may combine or divide signals from dividers 1102 or to combiners 1102. In the meantime, the single pole M throw switch 1106 may determine the number of signals to be combined or divided. The single pole M throw switch 1106 may have one input and M outputs or one output and M inputs. It should be appreciated that the single pole M throw switch 1106 may be any other suitable type of switch or component to control a number of multi inputs or outputs. The number of inputs or outputs in the single pole M throw switch 1106 may depend on the number of power dividers 1102 or antenna ports of the first antenna. The controller may control the one or more single pole M throw switches 1106 for the coupling between the first one or more signals and the third one or more signals and/or between the fourth one or more signals and the second one or more signals in the combiners 1106.

Unidirectional Routing System Using Two Lens Antennas

Figure 12:
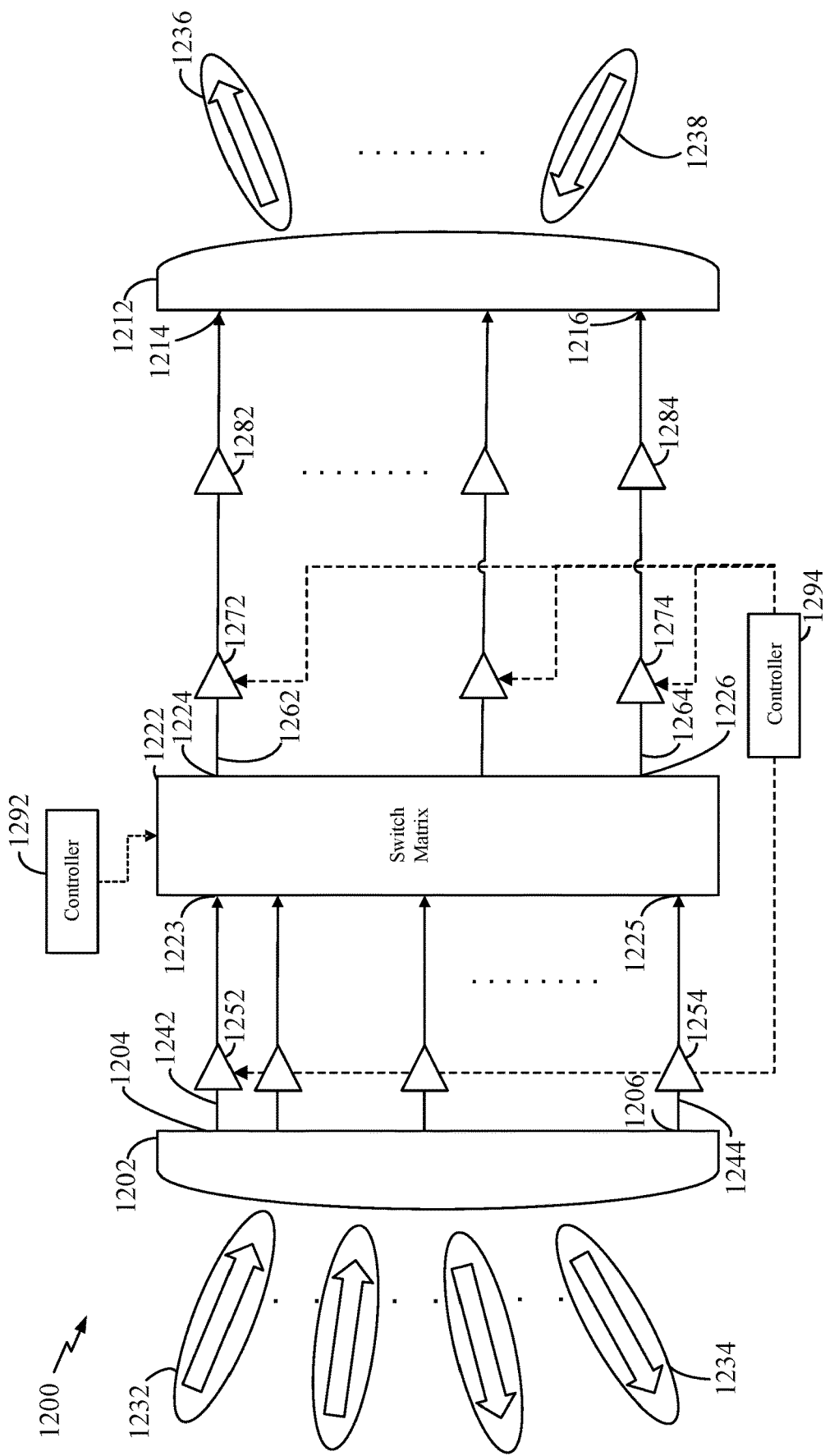
FIG. 12 is a schematic illustration of an exemplary unidirectional routing system or node using two lens antennas according to some aspects of the disclosure.

FIG. 12 illustrates an exemplary unidirectional routing system 1200 with two lens antennas 1202 and 1212 according to a further aspect of this disclosure. The routing system 1200 may include a first antenna 1202, a first lens antenna 1212, a switch matrix 1222, and a controller 1292, 1294. The first antenna 1202 may include a second lens antenna 1202. The second lens antenna 1202 may receive first one or more directional beams 1232, 1234 from corresponding first one or more nodes and generate first one or more signals 1242, 1244 corresponding to the first one or more directional beams 1232, 1234. The switch matrix 1222 may communicatively couple the second lens antenna 1202 with the first lens antenna 1212. In particular, the switch matrix 1222 may communicatively couple the first one or more signals 1242, 1244 with the third one or more signals 1262, 1264. The controller 1292 may control the switch matrix 1222 for communicatively coupling the first one or more signals 1242, 1244 with the third one or more signals 1262, 1264. The first lens antenna 1212 may receive the third one or more signals 1262, 1264 and transmit third one or more beams 1236, 1238 to corresponding third one or more nodes. The third one or more beams 1236, 1238 may correspond to the third one or more signals 1262, 1264.

For example, the second lens antenna 1202 may receive M first beams 1232, 1234 from corresponding M first nodes. Among M first beams 1232, 1234, the second lens antenna 1202 may receive first beam 1 (1232) and generate first signal 1 (1242) from antenna port 1 (1204) of the second lens antenna 1202. Then, LNA 1 (1252) may amplify the first signal 1 (1242) without additional noise. The switch matrix 1222 may receive the first signal 1 (1242). Similarly, the second lens antenna 1202 may receive beam M (1234) and generate first signal M (1244) from antenna port M (1206). Then, LNA M (1254) may amplify the first signal M (1244) without additional noise. The switch matrix 1222 may receive the first signal M (1244). This process may apply to the other first beams and first signals.

The switch matrix 1222 may communicatively couple the second lens antenna 1202 with the first lens antenna 1212. The controller 1292 may control the switch matrix 1222 for communicatively coupling the M first signals 1242, 1244 with the N third signals 1262, 1264. The switch matrix 1222 may receive the M first signals 1242, 1244 on M input ports 1223, 1225 of the switch matrix 1222. The switch matrix 1222 may transmit, from N output ports 1224, 1226 of the switch matrix, the N third signals to the first lens antenna 1212. The exemplary switch matrix 1222 is elaborated in FIGS. 10-11 and their corresponding description above. The input ports 1223, 1225 in the switch matrix 1222 may be coupled with the corresponding power dividers 1002, 1003, 1102 in the switch matrixes of FIGS. 10-11. The output ports 1224, 1226 in the switch matrix 1222 may be coupled with the corresponding power combiners 1006, 1007, 1106 in the switch matrix of FIGS. 10-11.

The switch matrix 1222 may produce N third signals 1262, 1264. Among the N third signals, the switch matrix 1222 may produce third signal 1 (1262). The switch matrix 1222 may communicatively couple the third signal 1 (1262) with one first signal or more first signals 1242, 1244. The third signal 1 (1262) may travel to PA driver 1 (1272) and PA 1 (1282) to amplify the third signal 1 (1262) to target transmitting power. The antenna port 1 (1214) of the first lens antenna 1212 may receive the amplified third signal 1 (1262). The first lens antenna 1212 may generate third beam 1 (1236) corresponding to the third signal 1 (1262). Then, the first lens antenna 1212 may transmit the third beam 1 (1236) to third node 1. Similarly, the switch matrix 1222 may produce third signal N (1264). The switch matrix 1222 may communicatively couple the third signal N (1264) with one first signal or more first signals 1242, 1244. The third signal N (1264) may travel to PA driver N (1274) and PA N (1284) to amplify the third signal N (1264) to target transmitting power. Antenna port N (1216) of the first lens antenna 1212 may receive the amplified third signal N (1264). The first lens antenna 1212 may generate third beam N (1238) corresponding to the third signal N (1264). Then, the first lens antenna 1212 may transmit the third beam N (1238) to third node N. This process may apply to the other third signals and third beams. Thus, the routing system 1200 may direct or redirect M first beams 1232, 1234 from M first nodes to N third beams to N third nodes.

Bidirectional Routing System Using Two Lens Antennas

Figure 13:
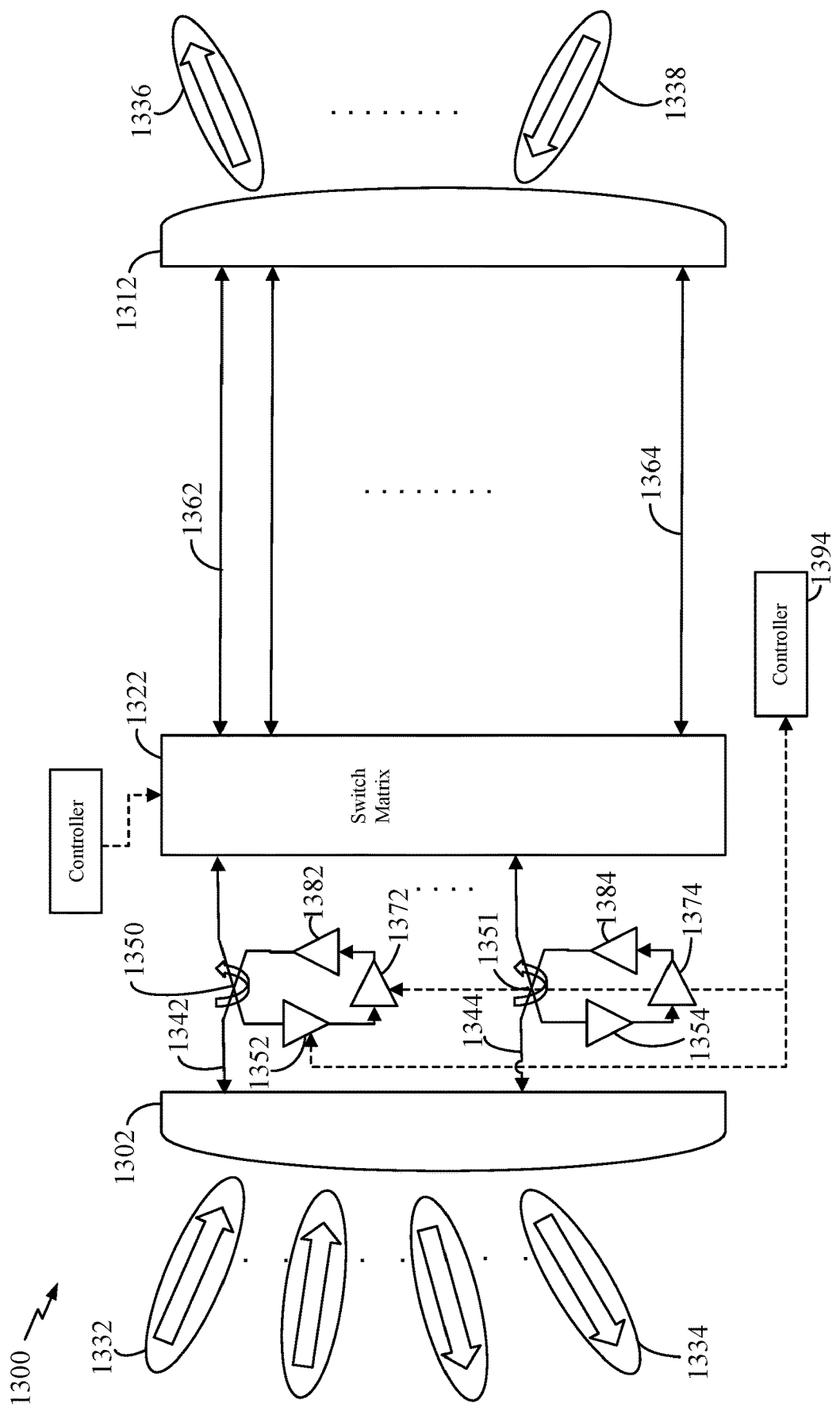
FIG. 13 is a schematic illustration of an exemplary bidirectional routing system or node using two lens antennas according to some aspects of the disclosure.

FIG. 13 illustrates an exemplary bidirectional routing system 1300 with two lens antennas 1302 and 1312 according to a further aspect of this disclosure. The routing system 1300 may include a first antenna 1302, a first lens antenna 1312, a switch matrix 1322, and a controller 1392, 1394. The first antenna 1302 may include a second lens antenna 1302. Additionally, the routing system 1300 may further include one or more switches 1350, 1351 for bidirectional communications.

The second lens antenna 1302, the first lens antenna 1312, and the switch matrix 1322 may operate the same as those in the switching matrix 1000, 1100 elaborated in FIGS. 10-11. However, the routing system 1300 may further include the one or more switches 1350, 1351 for bidirectional communications. For example, the switch 1350, 1351 for the bidirectional communications may include a double pole double throw (DPDT) switch 1350, 1351, which has two inputs and four outputs. However, the switch 1350, 1351 may not be limited to the DPDT switch. The switch 1350, 1351 may be any suitable type of switch or radio frequency component, which allows bidirectional communications. The switch 1350, 1351 with the LNA 1352, 1354, PA driver 1372, 1374, and PA 1382, 1384 for the bidirectional communications may operate the same as the switch 930 with the LNA 906, PA driver 924, and PA 926 described in FIG. 9.

For a communications direction, the second lens antenna 1302 may receive first one or more directional beams 1332, 1334 from corresponding first one or more nodes and generate first one or more signals 1342, 1344 corresponding to the first one or more directional beams 1332, 1334. The one or more switches 1350, 1351 may communicatively couple the second lens antenna 1302 with the switch matrix 1322 for bidirectional communications. The switch matrix 1322 may communicatively couple the second lens antenna 1302 with the first lens antenna 1312. In particular, the switch matrix 1322 may communicatively couple the first one or more signals 1342, 1344 with the third one or more signals 1362, 1364. The controller 1392 may control the switch matrix 1322 for communicatively coupling the first one or more signals 1342, 1344 with the third one or more signals 1362, 1364. The first lens antenna 1312 may transmit third one or more beams 1336, 1338 to one or more corresponding UEs. The third one or more beams 1336, 1338 may correspond to third one or more signals 1362, 1364.

For example, the routing system 1300 may redirect M first beams 1332, 1334 which the second lens antenna 1302 receives to N third beams 1336, 1338 which the first lens antenna 1312 transmits. The second lens antenna 1302 may receive M first beams from corresponding M first nodes and generate M first signals corresponding to the M first beams. Among the M first signals, first signal 1 (1342) may travel to LNA 1 (1352) through DPDT switch 1 (1350), which allows the one communications direction among bidirectional communications channels. The gain controller 1394 may control a power gain to the LNA 1 (1352) to make the weak signal 1342 strong without introducing noise or distortion to the signal 1342. PA driver 1 (1372) and PA 1 (1382) may amplify the power of the signal 1342 to target transmitting power in the first lens antenna 1312 based on the power gain controlled by the gain controller 1394. The amplified first signal 1 (1342) may travel to the switch matrix 1322. Similarly, first signal M (1344) may travel to LNA M (1354) through DPDT switch M (1351). The gain controller 1394 may control a power gain to the LNA M (1354) to make the weak signal 1344 strong without introducing noise or distortion to the signal 1344. PA driver M (1374) and PAM (1384) may amplify the power of the signal 1344 to target transmitting power in the first lens antenna 1312. The PA driver M (1374) may amplify the power of the signal 1344 based on the power gain controlled by the gain controller 1394. The amplified signal M (1344) may travel to the switch matrix 1322. This process may apply to the other first signals and first beams. Thus, the second lens antenna 1302 may receive the M first beams and transmit the M third signals corresponding to the M third beams to the switch matrix 1322.

The switch matrix 1322 may communicatively couple the second lens antenna 1302 with the first lens antenna 1312. The controller 1392 may control the switch matrix 1322 for communicatively coupling the M first signals 1342, 1344 with the N third signals 1362, 1364. The exemplary switch matrix 1322 is elaborated in FIGS. 10-11 and their corresponding description above.

The switch matrix 1322 may produce third signal 1 (1362) into which the switch matrix 1322 combines one or more first signals 1342, 1344. The first lens antenna 1312 may receive the third signal 1 (1362) from the switch matrix 1322 and generate third beam 1 (1336). Then, the first lens antenna 1312 may transmit the third beam 1 (1336) to third node 1. Similarly, the switch matrix 1322 may produce third signal N (1364) into which the switch matrix 1322 combines one or more first signals 1342, 1344. The first lens antenna 1312 may receive the third signal N (1362) from the switch matrix 1322 and generate third beam N (1338). Then, the first lens antenna 1312 may transmit the third beam N (1338) to third node N. This process may apply to the other third signals and third beams. Thus, the first lens antenna 1312 may receive N third signals and transmit N third beams corresponding to N third signals to corresponding N third nodes.

For a different communications direction, the first lens antenna 1312 may receive fourth one or more directional beams 1336, 1338 from corresponding fourth one or more nodes and generate fourth one or more signals 1362, 1364 corresponding to the fourth one or more directional beams 1336, 1338. The switch matrix 1322 may communicatively couple the fourth one or more signals 1362, 1364 with second one or more signals 1342, 1344. The controller 1392 may control the switch matrix 1322 for communicatively coupling the fourth one or more signals 1362, 1364 with the second one or more signals 1342, 1344. The one or more switches 1350, 1351 may communicatively couple the second lens antenna 1302 with the switch matrix 1322 for bidirectional communications. Thus, the one or more switches 1350, 1351 may allow bidirectional communications of the first one or more signals 1342, 1344 and the second one or more signals 1342, 1344. The second lens antenna 1302 may receive the second one or more signals 1342, 1344 and transmit second one or more beams 1332, 1334 to second one or more nodes. The second one or more beams 1332, 1334 may correspond to second one or more signals 1342, 1344.

For instance, the routing system 1300 may redirect N fourth beams 1336, 1338 received from corresponding N fourth nodes to M second beams 1332, 1334 transmitted to corresponding M second nodes. The first lens antenna 1312 may receive N fourth beams and generate N fourth signals corresponding to the N fourth beams. Among the N fourth signals, the first lens antenna 1312 may transmit fourth signal 1 (1362) to the switch matrix 1322. Similarly, the first lens antenna 1312 may transmit fourth signal N (1364) to the switch matrix 1322. This process may apply to the other fourth signals. Thus, the first lens antenna 1312 may receive N fourth beams 1336, 1338 and transmit corresponding N fourth signals 1362, 1364 to the switch matrix 1322.

The switch matrix 1322 may communicatively couple the first lens antenna 1312 with the second lens antenna 1302. The controller 1392 may control the switch matrix 1322 for communicatively coupling the N fourth signals 1362, 1364 with the M second signals 1342, 1344. The exemplary switch matrix 1322 is elaborated in FIGS. 10-11 and their corresponding description above.

The switch matrix may produce second signal 1 (1342) into which the switch matrix 1322 combines the one or more fourth signals 1362, 1364. The second signal 1 (1342) may travel to DPDT switch 1 (1350). The DPDT switch 1 (1350) may exploit another switch configuration for the second signal 1 (1342) to travel to the second lens antenna 1302. LNA 1 (1352) may receive the second signal 1 (1342) to amplify the weak power signal 1342. The LNA 1 (1352) may be the same as or different from LNA 1 (1352) for the other communications direction. PA driver 1 (1372) and PA 1 (1382) may also receive the second signal 1 (1342) to amplify the power of the signal 1342 to target transmitting power in the second lens antenna 1302. The PA driver 1 (1372) and the PA 1 (1382) may be the same as or different from the PA driver 1 (1372) and the PA 1 (1382) for the other communications direction. Then, the amplified second signal 1 (1342) travel the second lens antenna 1302. The second lens antenna 1302 may generate second beam 1 (1332) corresponding to the second signal 1 (1342) and transmit the second beam 1 (1332) to second node 1. Similarly, the switch matrix 1322 may produce second signal M (1344) into which the switch matrix 1322 combines the one or more fourth signals 1362, 1364. The second signal M (1344) may travel to DPDT switch M (1351). The DPDT switch M (1351) may exploit another switch configuration for the second signal M (1344) to travel to the second lens antenna 1302. LNA M (1354) may receive the second signal M (1344) to amplify the weak power signal 1344. The LNA M (1354) may be the same as or different from the LNA M (1354) for the other communications direction. PA driver M (1374) and PAM (1384) may also receive the second signal M (1344) to amplify the power of the signal 1344 to target transmitting power in the second lens antenna 1302. The PA driver M (1374) and the PAM (1384) may be the same as or different from the PA driver M (1374) and the PAM (1384) for the other communications direction. Each of the one or more second signals 1362, 1364 may travel through the respective DPDT switch 1350, 1351 to reach the second lens antenna 1302. This process may apply to the other second signals and second beams. Thus, the second lens antenna 1302 may receive M second signals and transmit M second beams corresponding to M second signals to M APs or UEs.

Full-Duplex Routing System Using Two Lens Antennas

Figure 14:
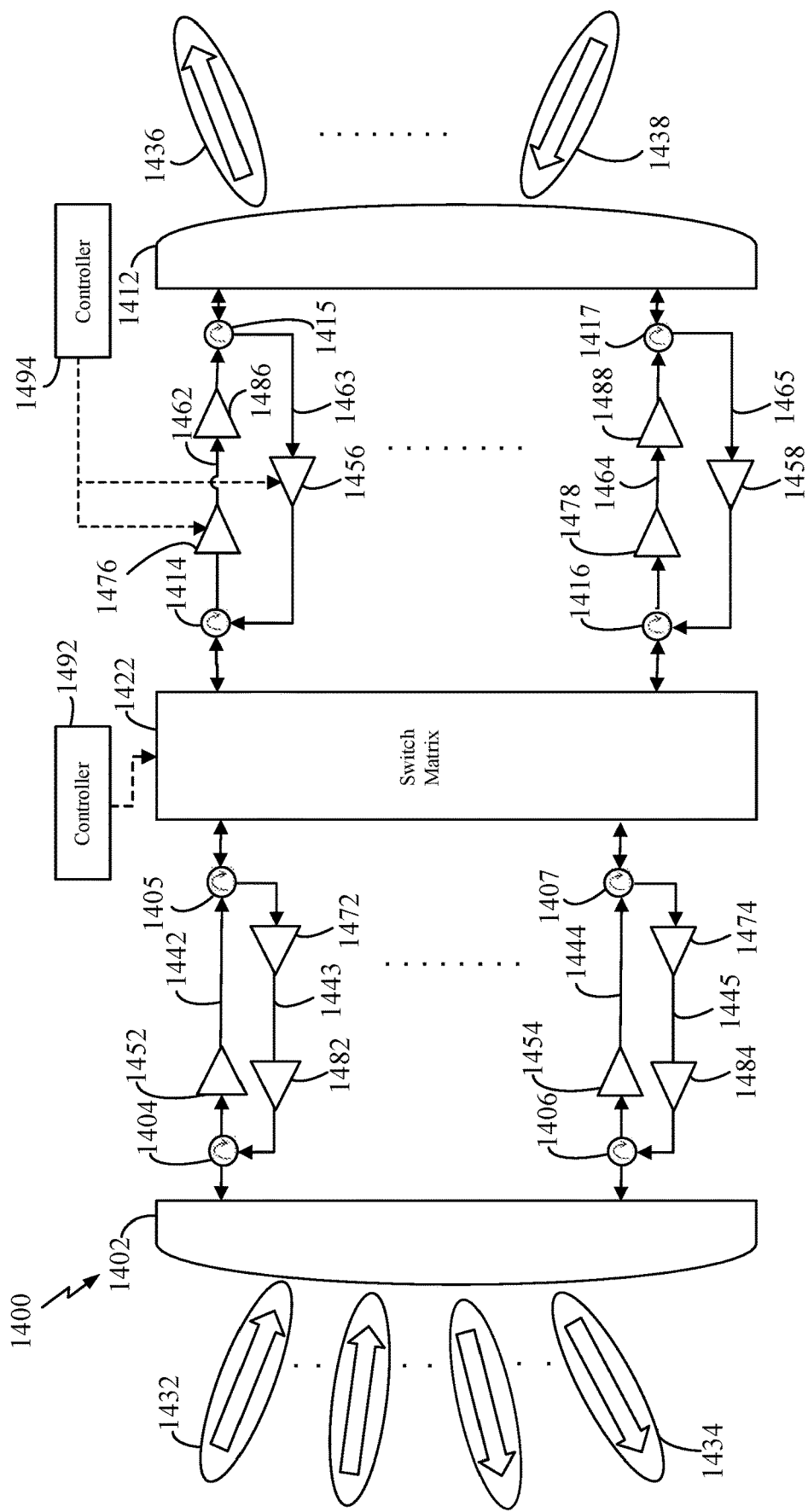
FIG. 14 is a schematic illustration of an exemplary bidirectional full-duplex routing system or node using two lens antennas according to some aspects of the disclosure.

FIG. 14 illustrates an exemplary bidirectional full-duplex routing system 1400 having two lens antennas 1402, 1412 according to a further aspect of this disclosure. The routing system 1400 may include a first antenna 1402, a first lens antenna 1412, a switch matrix 1422, and a controller 1492, 1494. The first antenna 1402 may include a second lens antenna 1402. The second lens antenna 1402, the first lens antenna 1412, and the switch matrix 1422 may operate the same as those in the switching matrix 1000, 1100 elaborated in FIGS. 10-11.

Additionally, the routing system 1400 may further include first one or more duplexers 1404, 1405, 1406, 1407 between the second lens antenna 1402 and the switch matrix 1422 for bidirectional full-duplex communications. In addition, the routing system 1400 may further include second one or more duplexers 1414, 1415, 1416, 1417 between the switch matrix 1422 and the first lens antenna 1412 for bidirectional full-duplex communications. The first one or more duplexers 1404, 1405, 1406, 1407 may correspond to the first one or more signals 1442, 1444 for one communications direction and the second one or more signals 1443, 1445 for a different communications direction. The second one or more duplexers 1414, 1415, 1416, 1417 may correspond to the third one or more signals 1462, 1464 and the fourth one or more signals 1463, 1465 for bidirectional full-duplex communications. A duplexer 1404-1407, 1414-1417 may allow bidirectional and duplex communications by isolating a transmitting circuit from a receiving circuit while permitting them to share a common circuit or system. The duplexer 1404-1407, 1414-1417 may include, but is not limited to, a transmit-receive switch, a hybrid coil, or a circulator.

In particular, one or more pairs of first duplexers 1404-1407 may communicatively couple the second lens antenna 1402 with the switch matrix 1422. Between a pair of first duplexers 1404, 1405, two communications channels 1442, 1443 may exist. The first communications channel is for a first signal 1442 transmitted from the second lens antenna 1402 to the switch matrix 1422, and the second channel is for a second signal 1443 transmitted from the switch matrix 1422 to the second lens antenna 1402. Thus, one duplexer 1404 of the pair may have three ports: first port for a shared channel from or to the second lens antenna 1402, second port for the first communications channel for the first signal 1442, and third port for the second channel for the second signal 1443. The other duplexer 1404 of the pair may also have three ports: first port for a shared channel from or to the switch matrix 1422, second port for the first communications channel for the first signal 1442, and third port for the second channel for the second signal 1443.

One or more pairs of second duplexers 1414-1417 may communicatively couple the switch matrix 1422 with the first lens antenna 1412. Between a pair of second duplexers 1414, 1415, two communications channels 1442, 1443 may exist. The first communications channel is for a third signal 1462 transmitted from the switch matrix 1422 to the first lens antenna 1412, and the second channel is for a fourth signal 1463 transmitted from the first lens antenna 1412 to the switch matrix 1422. Thus, one duplexer 1414 of the pair may have three ports: first port for a shared channel from or to the switch matrix 1422, second port for the first communications channel for the third signal 1462, and third port for the second channel for the fourth signal 1463. The other duplexer 1415 of the pair may also have three ports: first port for a shared channel to or from the first lens antenna 1412, second port for the first communications channel for the third signal 1462, and third port for the second channel for the fourth signal 1463.

For example, the routing system 1400 may redirect M first beams 1432, 1434 which the second lens antenna 1402 receives to N third beams 1436, 1438 which the first lens antenna 1412 transmits. The second lens antenna 1402 may receive the M first beams 1432, 1434 from corresponding M first nodes and generate M first signals 1442, 1444 corresponding to the M first beams 1432, 1434. Among the M first signals 1442, 1444, the second lens antenna 1402 may transmit first signal 1 (1442) to first duplexer 1-1 (1404). The first duplexer 1-1 (1404) may have three ports: first port for receiving the first signal 1 (1442) from the second lens antenna 1402, second port for transmitting the first signal 1 (1442) to the switch matrix 1422, and third port for receiving second signal 1 (1443) from the switch matrix 1422. The first duplexer 1-1 (1404) may receive, from the first port, the first signal 1 (1442) and transmit, from the second port of the first duplex 1 (1404), the first signal 1 (1442) to the switch matrix 1442. Then, first LNA 1 (1452) may amplify the weak signal 1442 without introducing noise or distortion to the first signal 1 1442. First duplexer 1-2 (1405) may receive the first signal 1 (1442). The first duplexer 1-2 (1405) may also have three ports: first port for transmitting the first signal 1 (1442) to the switch matrix 1422, second port for receiving the first signal 1 (1442) from the second lens antenna 1402, and third port for transmitting the second signal 1 (1443) to the second lens antenna 1402. The first duplexer 1-2 (1405) may receive, from the second port, the first signal 1 (1442) and transmit, from the first port of first duplex 2 (1405), the first signal 1 (1442) to the switch matrix

1422. The other first beams may undergo the same process described above. Thus, the second lens antenna 1402 may receive the M first beams 1432, 1434 and generate the M first signals 1442, 1444, which pass through the M first duplexers 1-1 (1404, 1406) and the M first duplexers 1-2 (1405, 1407). The switch matrix 1422 may receive the M first signals 1442, 1444.

The switch matrix 1422 may communicatively couple the second lens antenna 1402 with the first lens antenna 1412. The controller 1492 may control the switch matrix 1422 for communicatively coupling the M first signals 1442, 1444 with the N third signals 1462, 1464. The exemplary switch matrix 1422 is elaborated in FIGS. 10-11 and their corresponding description above.

The switch matrix 1422 may produce third signal 1 (1462) into which the switch matrix 1422 combines one or more first signals 1442, 1444. The third signal 1 (1462) may travel to second duplexer 1-1 (1414). The second duplexer 1-1 (1414) may have three ports: first port for receiving the third signal 1 (1462) from the switch matrix 1422, second port for transmitting the third signal 1 (1462) to the first lens antenna 1412, and third port for receiving fourth signal 1 (1463) from the first lens antenna 1412. The second duplexer 1-1 (1414) may receive, from the first port, the third signal 1 (1462) and transmit, from the second port, the third signal 1 (1462) to the first lens antenna 1412. Then, first PA driver 1 (1476) and first PA 1 (1486) may amplify the power of the third signal 1 (1462) to target transmitting power. Second duplexer 1-2 (1415) may receive the third signal 1 (1462). The second duplexer 1-2 (1415) may also have three ports: first port for transmitting the third signal 1 (1462) to the first lens antenna 1412, second port for receiving the third signal 1 (1462) from the switch matrix 1422, and third port for transmitting the fourth signal 1 (1463) to the switch matrix 1422. The second duplexer 1-2 (1415) may receive, from the second port, the third signal 1 (1462) and transmit, from the first port, the third signal 1 (1462) to the first lens antenna 1412. The first lens antenna 1412 may generate third beam 1 (1436) corresponding to the third signal 1 (1462) and transmit the third beam 1 (1436) to third node 1. The other third signals 1464 may undergo the same process described above. Thus, the N third signals pass through the N second duplexers 1-1 (1414, 1416) and the N second duplexers 1-2 (1415, 1417). The first lens antenna 1412 may generate the N third beams 1436, 1438 corresponding to the N third signals 1462, 1464 and transmit the N third beams 1436, 1438 to corresponding N third nodes.

Thanks to the duplexers, the routing system 1400 may perform full-duplex routing. Thus, the routing system 1400 may simultaneously redirect beams in a different communications direction as well. For example, the routing system 1400 may also direct or redirect N fourth beams 1436, 1438 which the first lens antenna 1412 receives to M second beams 1432, 1434 which the second lens antenna 1402 transmits. The first lens antenna 1412 may receive the N fourth beams 1436, 1438 from corresponding N fourth nodes and generate N fourth signals 1463, 1465 corresponding to the N fourth beams 1436, 1438. Among the N fourth signals, the fourth signal 1 (1463) may travel to the second duplexer 1-2 (1415). The second duplexer 1-2 (1415) may have three ports: first port for receiving the fourth signal 1 (1463) from the first lens antenna 1412, second port for receiving the third signal 1 (1462) from the switch matrix 1422, and third port for transmitting the fourth signal 1 (1463) to the switch matrix 1422. The second duplexer 1-2 (1415) may receive, from the first port, the fourth signal 1 and transmit, from the third port, the fourth signal 1 (1463) to the switch matrix 1442. Then, second LNA 1 (1456) may amplify the weak signal 1463 without introducing noise or distortion to the fourth signal 1 (1463). The second duplexer 1-1 (1414) may receive the fourth signal 1 (1463). The second duplexer 1-1 (1414) may also have three ports: first port for transmitting the fourth signal 1 (1463) to the switch matrix 1422, second port for transmitting the third signal 1 (1462) to the first lens antenna 1412, and third port for receiving the fourth signal 1 (1462) from the first lens antenna 1412. The second duplexer 1-1 (1414) may receive, from the third port, the fourth signal 1 (1462) and transmit, from the first port, the fourth signal 1 (1463) to the switch matrix 1422. Thus, the second duplexers 1414-1417 may allow bidirectional communications for the third one or more signals 1462, 1464 and the fourth one or more signals 1463, 1465. The other fourth beams 1438 may undergo the same process described above. Thus, the first lens antenna 1412 may receive the N fourth beams 1436, 1438 and generate the N fourth signals 1463, 1465, which pass through N second duplexers 1-2 (1415, 1417) and N second duplexers 1-1 (1414, 1416). The switch matrix 1422 may receive the N fourth signals 1463, 1465.

The switch matrix 1422 may communicatively couple the second lens antenna 1402 with the first lens antenna 1412. The controller 1492 may control the switch matrix 1422 for communicatively coupling the N fourth signals 1463, 1465 with the M second signals 1443, 1445. The exemplary switch matrix 1422 is elaborated in FIGS. 10-11 and their corresponding description above.

The switch matrix 1422 may produce second signal 1 (1443) into which the switch matrix 1422 combines one or more fourth signals 1463, 1465. The first duplexer 1-2 (1405) may receive the second signal 1 (1443). The first duplexer 1-2 (1405) may have three ports: first port for receiving the second signal 1 (1443) from the switch matrix 1422, second port for receiving first signal 1 (1442) from the second lens antenna 1402, and third port for transmitting the second signal 1 (1443) to the second lens antenna 1402. The first duplexer 1-2 (1405) may receive, from the first port, the second signal 1 (1443) and transmit, from the third port, the second signal 1 (1443) to the second lens antenna 1402. Then, second PA driver 1 (1472) and second PA 1 (1482) may amplify the power of the second signal 1 (1443) to target transmitting power. The first duplexer 1-1 (1404) may receive the second signal 1 (1443). The first duplexer 1-1 (1404) may also have three ports: first port for transmitting the second signal 1 (1443) to the second lens antenna 1402, second port for transmitting first signal 1 (1442) to the switch matrix 1422, and third port for receiving the second signal 1 (1443) from the switch matrix 1422. The first duplexer 1 (1404) may receive, from the third port, the second signal 1 (1443) and transmit, from the first port, the second signal 1 (1443) to the second lens antenna 1402. Thus, the first duplexers 1404-1407 may allow bidirectional communications for the first one or more signals 1442, 1444 and the second one or more signals 1443, 1445. The second lens antenna 1402 may generate second beam 1 (1432) corresponding to the second signal 1 (1443) and transmit the second beam 1 (1432) to second node 1. The other second signals 1445 may undergo the same process described above. Thus, the switch matrix 1422 may transmit the M second signals, which pass through the M first duplexers 1-2 (1405, 1407) and the M first duplexers 1-1 (1404, 1406). The second lens antenna 1402 may receive the M second signals and generate the M second beams 1432, 1434 corresponding to the M second signals 1443, 1445. Finally, the second lens antenna 1402 may transmit the M second beams 1432, 1434 to corresponding M second nodes.

Bidirectional FDD Routing System Using Two Lens Antennas

Figure 15:
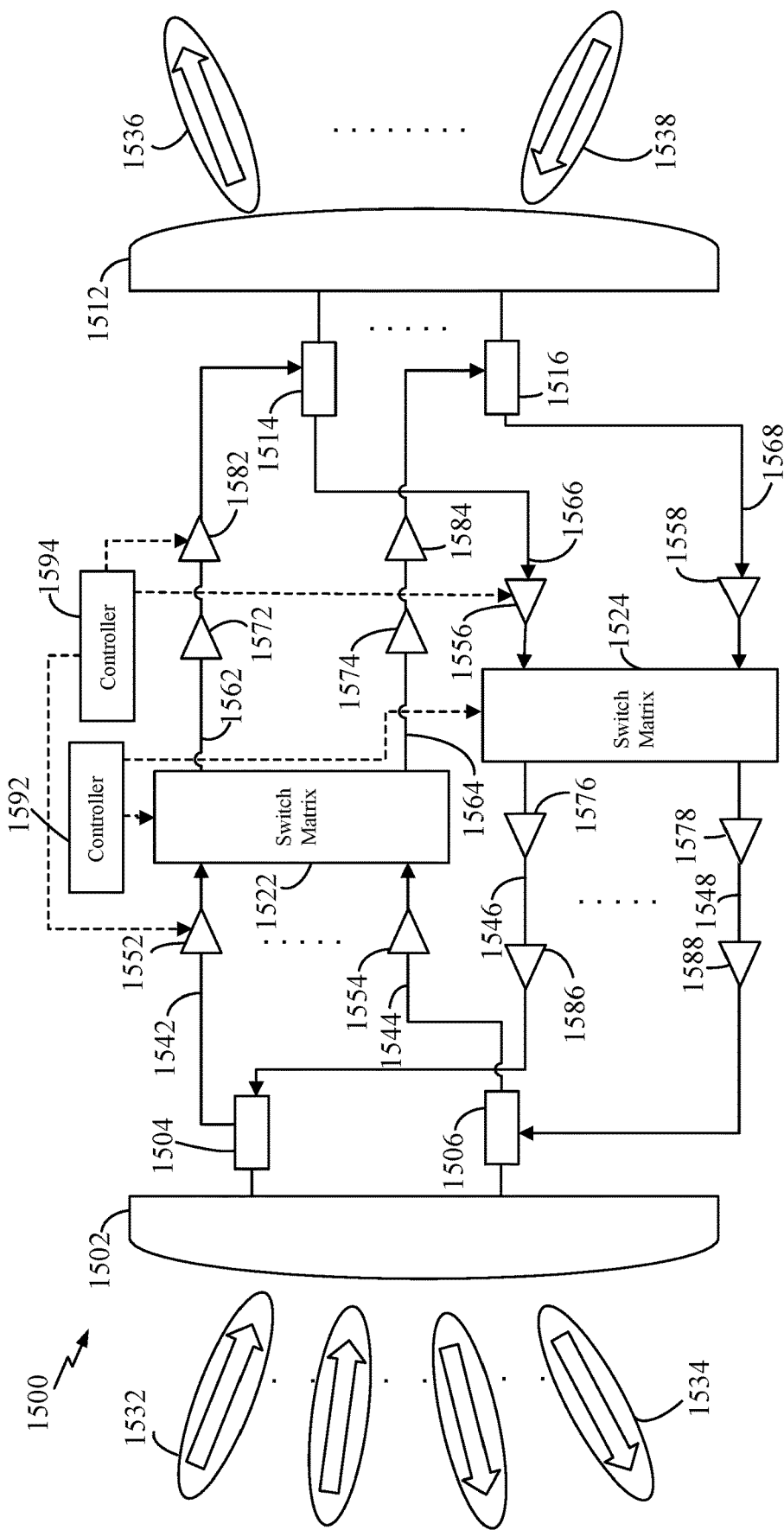
FIG. 15 is a schematic illustration of an exemplary bidirectional frequency division duplex routing system or node using two lens antennas according to some aspects of the disclosure.

FIG. 15 illustrates an exemplary bidirectional FDD routing system 1500 having two lens antennas 1502, 1512 according to a further aspect of this disclosure. The routing system 1500 may exploit one frequency band for a communications direction and another frequency band for a different communications direction. Thus, the routing system 1500 may be bidirectional FDD. The routing system 1500 may include a first antenna 1502, a first lens antenna 1512, and a controller 1592, 1594. The first antenna 1502 may include a second lens antenna 1502. The second lens antenna 1502 and the first lens antenna 1512 may operate the same as those in the routing system 1300, 1400 elaborated in FIGS. 13-14. The routing system 1500 may further include a first switch matrix 1522, a second switch matrix 1524, first one or more frequency-domain multiplexers 1504, 1506, and second one or more frequency-domain multiplexers 1514, 1516.

The first switch matrix 1522 may communicatively couple the second lens antenna 1502 with the first lens antenna 1512 for a communications direction. The first switch matrix 1522 may have the same components as those in the switch matrix 1000, 1100 illustrated in FIGS. 10-11. The first switch matrix 1522 may be a unidirectional switch matrix for a communication direction. The first switch matrix 1522 may communicatively couple the first one or more signals 1542, 1544 from the second lens antenna 1502 with the third one or more signals 1562, 1564. The first one or more signals 1542, 1544 may correspond to the first one or more beams 1532, 1534 which the second lens antenna 1502 receives from first one or more nodes. The third one or more signals 1562, 1564 may correspond to the third one or more beams 1536, 1538 which the first lens antenna 1512 transmits to third one or more nodes.

The second switch matrix 1524 may communicatively couple the first lens antenna 1512 with the second lens antenna 1502 for a communications direction. The second switch matrix 1524 may have the same components as those in the switch matrix 1000, 1100 illustrated in FIGS. 10-11. The second switch matrix 1524 may be a unidirectional switch matrix for a different communications direction from the first switch matrix. The second switch matrix 1524 may communicatively couple the fourth one or more signals 1566, 1568 from the first lens antenna 1512 with the second one or more signals 1546, 1548. The fourth one or more signals 1566, 1568 may correspond to the fourth one or more beams 1536, 1538 which the first lens antenna 1512 receives from fourth one or more nodes. The second one or more signals 1546, 1548 may correspond to the second one or more beams 1532, 1534 which the second lens antenna 1502 transmits to second one or more nodes.

The first one or more frequency-domain multiplexers 1504, 1506 may communicatively couple the second lens antenna 1502 with the first switch matrix 1522 and with the second switch matrix 1524. The first one or more frequency-domain multiplexers 1504, 1506 may correspond to the first one or more signals 1542, 1544 and to the second one or more signals 1546, 1548. The first one or more signals 1542, 1544 and the second one or more signals 1546, 1548 may be in disjoint frequency bands.

The second one or more frequency-domain multiplexers 1514, 1516 may communicatively couple the first lens antenna 1512 with the first switch matrix 1522 and with the second switch matrix 1524. The second one or more frequency-domain multiplexers 1514, 1516 may correspond to the third one or more signals 1562, 1564 and to the fourth one or more signals 1566, 1568. The third one or more signals 1562, 1564 and the fourth one or more signals 1566, 1568 may also be in disjoint frequency bands. A frequency-domain multiplexer 1504, 1506, 1514, 1516 may be a diplexer or a frequency filter. However, it should be appreciated that the frequency-domain multiplexer 1504, 1506, 1514, 1516 is not limited to the listed devices or components. The frequency-domain multiplexer 1504, 1506, 1514, 1516 may be any device or component for multiplexing two signals in frequency domain into one signal. The frequency-domain multiplexer 1504, 1506, 1514, 1516 may implement frequency-domain multiplexing. The frequency-domain multiplexer 1504, 1506, 1514, 1516 may have three ports. A signal in the first port and another signal in the second port are in different frequency bands. The two signals in the first and second ports are multiplexed onto the third port. Thus, due to the first switch matrix 1522 and the second switch matrix 1524 along with the frequency-domain multiplexers 1504, 1506, 1514, 1516, the routing system may be bidirectional and frequency division duplex.

For example, the routing system 1500 may direct or redirect M first beams 1532, 1534 which the second lens antenna 1502 receives to N third beams 1536, 1538 which the first lens antenna 1512 transmits. The second lens antenna 1502 may receive the M first beams 1532, 1534 from corresponding M first nodes and generate M first signals 1542, 1544 corresponding to the M first beams 1532, 1534. Among the M first signals, the second lens antenna 1502 may transmit first signal 1 (1542) to first frequency-domain multiplexer 1 (1504). The first frequency-domain multiplexer 1 (1504) may have three ports: first port for receiving the first signal 1 (1542) from the second lens antenna 1502, second port for transmitting the first signal 1 (1542) to the first switch matrix 1522, and third port for receiving second signal 1 (1546) from the second switch matrix 1524. The first frequency-domain multiplexer 1 (1504) may receive, from the first port, the first signal 1 (1542) and transmit, from the second port, the first signal 1 (1542) to the first switch matrix 1542. First LNA 1 (1552) may amplify the weak signal 1542 without introducing noise or distortion to the first signal 1 (1542). Then, the first switch matrix 1522 may receive the first signal 1. The other first beams may undergo the same process described above. Thus, the second lens antenna 1502 may receive the M first beams 1532, 1534 and generate the M first signals 1542, 1544, which pass through the M first frequency-domain multiplexers 1504, 1506. The first switch matrix 1522 may receive the M first signals 1542, 1544.

The first switch matrix 1522 may communicatively couple the second lens antenna 1502 with the first lens antenna 1512. The controller 1592 may control the first switch matrix 1522 for communicatively coupling the M first signals 1542, 1544 with the N third signals 1562, 1564. The exemplary first switch matrix 1522 is elaborated in FIGS. 10-11 and their corresponding description above.

The first switch matrix 1522 may produce third signal 1 (1562) into which the first switch matrix 1522 combines one or more first signals 1542, 1544. First PA driver 1 (1572) and first PA 1 (1582) may amplify the power of the third signal 1 (1562) to target transmitting power. Then, second frequency-domain multiplexer 1 (1514) may receive the third signal 1 (1562). The second frequency-domain multiplexer 1 (1514) may have three ports: first port for transmitting the third signal 1 (1562) to the first lens antenna 1512, second port for receiving the third signal 1 (1562) from the first switch matrix 1522, and third port for transmitting fourth signal 1 (1566) to the second switch matrix 1524. Then, the second frequency-domain multiplexer 1 (1514) may receive, from the second port, the third signal 1 (1562) and transmit, from the first port, the third signal 1 (1562) to the first lens antenna 1512. The other third signals may undergo the same process described above. Thus, the first switch matrix 1522 may transmit the N third signals 1562, 1564 to the first lens antenna 1512 through N second frequency-domain multiplexers 1514, 1516. Then, the first lens antenna 1512 generate the N third beams corresponding to the N third signals 1562, 1564. Finally, first lens antenna 1502 may transmit the N third beams to corresponding N third nodes.

At the same time, the routing system 1500 may simultaneously direct or redirect beams in a different communications direction as well. For example, the routing system 1500 may also redirect N fourth beams 1536, 1538 which the first lens antenna 1512 receives to M second beams 1532, 1534 which the second lens antenna 1502 transmits. The first lens antenna 1512 may receive the N fourth beams 1536, 1538 from corresponding N fourth nodes and generate N fourth signals 1563, 1565 corresponding to the N fourth beams 1536, 1538. Among the N fourth signals, the first lens antenna 1512 may transmit the fourth signal 1 (1566) to the second frequency-domain multiplexer 1 (1514). The second frequency-domain multiplexer 1 (1514) may have three ports: first port for receiving fourth signal 1 (1566) from the second lens antenna 1512, second port for receiving the third signal 1 (1462) from the first switch matrix 1522, and third port for transmitting the fourth signal 1 (1566) to the second switch matrix 1524. The first port of the second frequency-domain multiplexer 1 (1514) may be in use for transmitting the third signal 1 (1562) and receiving the fourth signal 1 (1566) at the same time. The second frequency-domain multiplexer 1 (1514) may receive, from the first port, the fourth signal 1 (1566) and transmit, from the third port, the fourth signal 1 (1566) to the second switch matrix 1524. Second LNA 1 (1556) may amplify the weak signal 1566 without introducing noise or distortion to the fourth signal 1 (1566). The second switch matrix 1524 may receive the fourth signal 1 (1566). The other fourth beams 1538 and signals 1568 may undergo the same process described above. Thus, the first lens antenna 1512 may receive the N fourth beams 1536, 1538 and generate the N fourth signals 1566, 1568, which pass through N second frequency-domain multiplexers 1514, 1516. The second switch matrix 1524 may receive the N fourth signals 1566, 1568.

The second switch matrix 1524 may communicatively couple the first lens antenna 1512 with the second lens antenna 1502. The controller 1592 may control the second switch matrix 1524 for communicatively coupling the N fourth signals 1566, 1568 with the M second signals 1546, 1548. The exemplary second switch matrix 1524 is elaborated in FIGS. 10-11 and their corresponding description above. The second matrix 1524 may be a unidirectional switch matrix.

The second switch matrix 1524 may produce the second signal 1 (1546) into which the second switch matrix 1524 combines one or more fourth signals 1566, 1568. Second PA driver 1 (1576) and second PA 1 (1586) may amplify the power of the second signal 1 (1546) to target transmitting power. The first frequency-domain multiplexer 1 (1504) may receive the second signal 1 (1546). The first frequency-domain multiplexer 1 (1504) may also have three ports: first port for transmitting the second signal 1 (1546) to the second lens antenna 1502, second port for transmitting the first signal 1 (1542) to the first switch matrix 1522, and third port for receiving the second signal 1 (1546) from the second switch matrix 1524. The first port of the first frequency-domain multiplexer 1 (1514) may be in use for receiving the first signal 1 (1542) and transmitting the second signal 1 (1546) at the same time. The first frequency-domain multiplexer 1 (1504) may receive, from the third port, the second signal 1 (1546) and transmit, from the first port, the second signal 1 (1546) to the second lens antenna 1502. The second lens antenna 1502 may generate second beam 1 (1532) corresponding to the second signal 1 (1546) and transmit second beam 1 (1532) to second node 1. The other second signals 1548 may undergo the same process described above. Thus, the second switch matrix 1524 may transmit the M second signals, which pass through the M first frequency-domain multiplexers 1504, 1506. The second lens antenna 1502 may generate the M second beams 1532, 1534 corresponding to the M second signals 1546, 1548 and transmit the M second beams 1532, 1534 to corresponding M second nodes.

Flow Chart

FIG. 16 is a flow chart illustrating an exemplary process 1600 for wireless communications in accordance with some aspects of the present disclosure. As described below, some or all illustrated features may be omitted in a particular implementation within the scope of the present disclosure, and some illustrated features may not be required for implementation of all embodiments. In some examples, the process 1600 may be carried out by the node 400 illustrated in FIG. 4. In some examples, the process 1600 may be carried out by any suitable apparatus or means for carrying out the functions or algorithm described below.

The process 1600 may include at least one of: a first routing process 1602 or a second routing process 1604. The first routing process 1602 may include blocks 1610, 1612, 1614, and 1616 while the second routing process 1604 may include blocks 1620, 1622, 1624, and 1626.

At block 1610, a first antenna 702 (802, 902, 1202, 1302, 1402, 1502) may receive first one or more directional beams 722 from first one or more nodes 752, and generate first one or more signals 714 (845, 945, 1242, 1342, 1442, 1542) corresponding to the first one or more directional beams 722. The first antenna 702 may include a phased array 802, 902 or a lens antenna 1202, 1302, 1402, 1502.

At block 1612, a controller 742, 816, 916, 1292, 1392, 1492, 1592 may control the switch matrix 732 for communicatively coupling the first one or more signals 714 with the third one or more signals 716. Specifically, the controller 742 may control the one or more switches 1004, which electrically connect and disconnect the one or more power dividers 1002 to the one or more power combiners 1006. The controller 742 may control the switch matrix 732 based on, e.g., at least one of: first one or more nodes' locations to transmit the second or third one or more beams 724, second or third one or more nodes' reference signals, historical routing, or one or more controlling signals from a base station.

At block 1614, a switch matrix 732, 831, 931, 1000, 1100, 1222, 1322, 1422, 1552 may communicatively couple the first antenna 702 with a first lens antenna 704, 836, 936, 1212, 1312, 1412, 1512. In particular, the switch matrix 732 may communicatively couple each of the first one or more signals 714 with each of third one or more signals 716, 848, 948, 1262, 1362, 1462, 1562. The third one or more signals 716 may correspond to third one or more beams 724, 838, 938, 1236, 1336, 1436, 1536 transmitted to third one or more nodes 754. The switch matrix 1000, 1100 may include one or more power dividers 1002, 1102 corresponding to the first one or more signals 714 and one or more power combiners 1006, 1106 corresponding to the third one or more signals 716. A power divider 1002 of the one or more power dividers 1002 may divide a signal of the first one or more signals 714 and communicatively couple the divided signals with each of the one or more power combiners 1006. A power combiner 1006 of the one or more power combiners 1006 may combine divided signals from a set of one or more power dividers 1002 into one signal of the third one or more signals 716. The power divider 1002 and power combiner 1006 may be the Wilkinson power divider/combiner. The Wilkinson power divider/combiner may function as a power divider and a power combiner depending on the communications direction because the Wilkinson power divider/combiner is passive and reciprocal device. The switch matrix 732 may include one or more switches 1004, 1005, 1106 for communicatively coupling the first one or signals with the third one or more signals 716. The switch 1004 may be a SPST switch to communicatively couple a power divider 1002 of the one or more dividers 1002 with a power combiner 1006 of the one or more power combiners 1006. The switch 1106 may be a SPMT switch integrated with a power combiner 1106. However, the switch 1004 is not limited to the SPST switch or SPMT switch. The switch 1004 could be any other suitable switch to connect and disconnect a power divider 1002 to a power combiner 1006.

At block 1616, the first lens antenna 704 may transmit third one or more directional beams 724, 838, 938, 1236, 1336, 1436, 1536 corresponding to the third one or more signals 716. The first lens antenna 704 may receive the third one or more signals 716 from the switch matrix 732 and generate the third one or more directional beams 724 corresponding to the third one or more signals 716. The first lens antenna 704 may include one or more antenna ports 708, 834, 934, 1214, corresponding to the third one or more beams 724. Each antenna port is predetermined, due to lens antenna characteristics, to direct a respective beam of the third one or more beams 724 to a specific direction. However, the direction of a beam may be adjustable as well.

Block 1604 describes the second routing process in a different communications direction from the direction of the first routing process. At block 1620, the first lens antenna 704 may receive fourth one or more directional beams 728, 938, 1336, 1436, 1536 and generate fourth one or more signals 718, 948, 1362, 1463, 1566 corresponding to the fourth one or more directional beams 728.

At block 1622, a controller 742 may control the switch matrix 732 or the second switch matrix 1524 for communicatively coupling the fourth one or more signals 718 with the second one or more signals 720. Specifically, the controller 742 may control the one or more switches, which electrically connect and disconnect the one or more power dividers 1006 to the one or more power combiners 1002. The controller 742 may control the switch matrix 732 or the second switch matrix 1524 based on, e.g., at least one of: second one or more nodes' locations to transmit the second or third one or more beams 726, second or third one or more nodes' reference signals, historical routing, or one or more controlling signals from a base station.

At block 1624, the switch matrix 732 may communicatively couple the first antenna 702 with the first lens antenna 704. For this communications direction, a second switch matrix 1524 may be in use for FDD. In particular, the switch matrix 732 may communicatively couple each of the fourth one or more signals 718 with each of second one or more signals 720, 945, 1342, 1443. The second switch matrix 1524 may communicatively couple each of the fourth one or more signals 1566 with each of second one or more signals 1546. The second one or more signals 720 may correspond to second one or more beams 726 transmitted to second one or more nodes 756. The switch matrix 732 and the second switch matrix 1524 may include one or more power dividers 1006, 1106 corresponding to the fourth one or more signals 718 and one or more power combiners 1002, 1102 corresponding to the second one or more signals 720. A power divider 1006 of the one or more power dividers 1006 may divide a signal of the fourth one or more signals 718 and communicatively couple the divided signals with each of the one or more power combiners 1002. A power combiner 1002 of the one or more power combiners 1002 may combine divided signals from a set of one or more power dividers into one signal of the second one or more signals 720. Here, the power divider 1006 may be the power combiner 1006 in the first routing process while the power combiner 1002 may be the power divider 1002 in the first routing process. The power divider 1006 and power combiner 1002 may be the Wilkinson power divider/combiner. The switch matrix 732 or the second switch matrix 1524 may include one or more switches 1005 for communicatively coupling the fourth one or more signals 718 with the second one or more signals 720. The switch 1005 may be a SPST switch to communicatively couple a power divider 1006 of the one or more dividers 1006 with a power combiner 1002 of the one or more power combiners 1002. The switch 1106 may be a SPMT switch integrated with a power combiner 1106. However, the switch 1005 is not limited to the SPST switch or SPMT switch. The switch could be any other suitable switch to connect and disconnect a power divider to a power combiner.

At block 1626, the first antenna 702 may transmit second one or more directional beams 726, 1332, 1432, 1532 corresponding to the second one or more signals 720. The first antenna 702 may include a phased array 901 or a lens antenna 1302, 1402, 1502. The first antenna 702 may receive the second one or more signals 720 from the switch matrix 732 or the second switch matrix 1524 and generate the second one or more directional beams 726 corresponding to the second one or more signals 720.

Further Examples Having a Variety of Features:

Implementation examples are described in the following numbered Examples:

Example 1: A node for wireless communications, comprising: a switch matrix communicatively coupled between a first antenna and a first lens antenna, wherein the first antenna is configured for at least one of: receiving first one or more directional beams and generating first one or more signals corresponding to the first one or more directional beams, or transmitting second one or more directional beams corresponding to second one or more signals, and wherein the first lens antenna is configured for at least one of: transmitting third one or more directional beams corresponding to third one or more signals, or receiving fourth one or more directional beams and generating fourth one or more signals corresponding to the fourth one or more directional beams; and a controller configured to control the switch matrix for at least one of: communicatively coupling the first one or more signals with the third one or more signals, or communicatively coupling the fourth one or more signals with the second one or more signals.

Example 2: The node of Example 1, wherein the switch matrix comprises one or more switches for at least one of: communicatively coupling each of the first one or more signals with each of the third one or more signals, or communicatively coupling each of the fourth one or more signals with each of the second one or more signals.

Example 3: The node of Examples 1 to 2, wherein the controller is configured to control the switch matrix based on at least one of: one or more nodes' locations to transmit the second or third one or more beams, second or third one or more nodes' reference signals, historical routing, or one or more controlling signals from a base station.

Example 4: The node of Examples 1 to 3, wherein the first antenna comprises a phased array for receiving a beam of the first one or more directional beams and generating a signal of the first one or more signals, the signal corresponding to the beam, wherein the switch matrix communicatively couples the phased array with the first lens antenna, wherein the controller is configured to control the switch matrix for communicatively coupling the signal with the third one or more signals, and wherein the first lens antenna transmits the third one or more directional beams.

Example 5: The node of Examples 1 to 3, wherein the first antenna comprises a phased array for at least one of: receiving a first directional beam of the first one or more directional beams and generating a first signal of the first one or more signals, the first signal corresponding to the beam, or transmitting a second directional beam of the second one or more directional beams, the second directional beam corresponding to a second signal of the second one or more signals, wherein the node further comprises a switch communicatively coupled between the phased array and the switch matrix for bidirectional communications, and wherein the controller is configured to control the switch matrix for at least one of: communicatively coupling the first signal with the third one or more signals, or communicatively coupling the fourth one or more signals with the second signal.

Example 6: The node of Examples 1 to 3, wherein the first antenna comprises a second lens antenna for receiving the first one or more directional beams and generating the first one or more signals corresponding to the first one or more directional beams, wherein the first lens antenna is configured to transmit the third one or more directional beams corresponding to the third one or more signals, and wherein the controller is configured to control the switch matrix for communicatively coupling the first one or more signals with the third one or more signals.

Example 7: The node of Examples 1 to 3, wherein the first antenna comprises a second lens antenna, the node further comprising one or more switches communicatively coupled between the second lens antenna and the switch matrix for bidirectional communications of the corresponding first one or more signals and the corresponding second one or more signals.

Example 8: The node of Examples 1 to 3, wherein the first antenna comprises a second lens antenna, the node further comprising: first one or more duplexers communicatively coupled between the second lens antenna and the switch matrix for bidirectional communications of the corresponding first one or more signals and the corresponding second one or more signals; and second one or more duplexers communicatively coupled between the first lens antenna and the switch matrix for bidirectional communications of the corresponding third one or more signals and the corresponding fourth one or more signals.

Example 9: The node of Examples 1 to 3, wherein the first antenna comprises a second lens antenna, wherein the node further comprises a second switch matrix communicatively coupled between the second lens antenna and the first lens antenna, and wherein the controller is configured to control at least one of: the second switch matrix for communicatively coupling the fourth one or more signals with the second one or more signals, or the switch matrix for communicatively coupling the first one or more signals with the third one or more signals.

Example 10: The node of Examples 1 to 3 and 9, further comprising: first one or more frequency-domain multiplexers communicatively coupling the second lens antenna with the corresponding first one or more signals and the corresponding second one or more signals; and second one or more frequency-domain multiplexers communicatively coupling the first lens antenna with the corresponding third one or more signals and the corresponding fourth one or more signals.

Example 11: A node for wireless communications, comprising: a first means for communicatively coupling a first antenna with a first lens antenna, wherein the first antenna is configured for at least one of: receiving first one or more directional beams and generating first one or more signals corresponding to the first one or more directional beams, or transmitting second one or more directional beams corresponding to second one or more signals, and wherein the first lens antenna is configured for at least one of: transmitting third one or more directional beams corresponding to third one or more signals, or receiving fourth one or more directional beams and generating fourth one or more signals corresponding to the fourth one or more directional beams; and a second means for controlling the first means for communicatively coupling the first antenna with the first lens antenna for at least one of: communicatively coupling the first one or more signals with the third one or more signals, or communicatively coupling the fourth one or more signals with the second one or more signals.

Example 12: The node of Example 11, wherein the first means comprises one or more switches for at least one of: communicatively coupling each of the first one or more signals with each of the third one or more signals, or communicatively coupling each of the fourth one or more signals with each of the second one or more signals.

Example 13: The node of Examples 11 to 12, wherein the first antenna comprises a second lens antenna for receiving the first one or more directional beams and generating the first one or more signals corresponding to the first one or more directional beams, wherein the first lens antenna is configured to transmit the third one or more directional beams corresponding to the third one or more signals, and wherein the second means for controlling the first means for communicatively coupling the first one or more signals with the third one or more signals.

Example 14: The node of Examples 11 to 12, wherein the first antenna comprises a second lens antenna, the node further comprising third one or more means for communicatively coupling the second lens antenna with the first means for bidirectional communications of the corresponding first one or more signals and the corresponding second one or more signals.

Example 15: The node of Examples 11 to 12, wherein the first antenna comprises a second lens antenna, the node further comprising: fourth one or more means for communicatively coupling the second lens antenna with the first means for bidirectional communications of the corresponding first one or more signals and the corresponding second one or more signals; and fifth one or more means for communicatively coupling the first lens antenna with the first means for bidirectional communications of the corresponding third one or more signals and the corresponding fourth one or more signals.

Example 16: The node of Examples 11 to 12, wherein the first antenna comprises a second lens antenna, the node further comprising a sixth means for communicatively coupling the second lens antenna with the first lens antenna, and wherein the second means is configured for controlling at least one of: the first means for communicatively coupling the fourth one or more signals with the second one or more signals, or the first means for communicatively coupling the first one or more signals with the third one or more signals.

Example 17: The node of Examples 11 to 12 and 16, further comprising: seventh one or more means for communicatively coupling the second lens antenna with the corresponding first one or more signals and the corresponding second one or more signals; and eighth one or more means for communicatively coupling the first lens antenna with the corresponding third one or more signals and the corresponding fourth one or more signals.

Example 18: A method for wireless communications, comprising: receiving, from a first antenna, first one or more directional beams; generating first one or more signals corresponding to the first one or more directional beams; transmitting, from a first lens antenna, third one or more directional beams corresponding to third one or more signals; communicatively coupling, by a switch matrix, the first antenna with the first lens antenna; and controlling the switch matrix for communicatively coupling the first one or more signals with the third one or more signals.

Example 19: The method of Example 18, further comprising: receiving, from the first lens antenna, fourth one or more directional beams; generating fourth one or more signals corresponding to the fourth one or more directional beams; transmitting, from the first antenna, second one or more directional beams corresponding to second one or more signals; determining second one or more directions to transmit the second one or more directional beams; communicatively coupling, by the switch matrix, the first antenna with the first lens antenna; and controlling the switch matrix for communicatively coupling the fourth one or more signals with the second one or more signals.

Example 20: The method of Examples 19, wherein the switch matrix comprises one or more switches, wherein controlling the switch matrix for communicatively coupling the first one or more signals with the third one or more signals comprises controlling the one or more switches for communicatively coupling each of the first one or more signals with each of the third one or more signals, wherein controlling the switch matrix for communicatively coupling the fourth one or more signals with the second one or more signals comprises controlling the one or more switches for communicatively coupling each of the fourth one or more signals with each of the second one or more signals.

Example 21: The method of Examples 19, wherein the first antenna comprises a second lens antenna, the method further comprising: communicatively coupling, by one or more switches, the second lens antenna with the switch matrix for bidirectional communications of the corresponding first one or more signals and the corresponding second one or more signals; and communicatively coupling, by the one or more switches, the switch matrix with the second lens antenna for bidirectional communications of the corresponding first one or more signals and the corresponding second one or more signals.

Example 22: The method of Examples 19, wherein the first antenna comprises a second lens antenna, the method further comprising: communicatively coupling, by first one or more duplexers, the second lens antenna with the switch matrix for bidirectional communications of the corresponding first one or more signals and the corresponding second one or more signals; and communicatively coupling, by second one or more duplexers, the first lens antenna with the switch matrix for bidirectional communications of the corresponding third one or more signals and the corresponding fourth one or more signals.

Example 23: The method of Examples 18, wherein the first antenna comprises a second lens antenna, the method further comprising: receiving, from the first lens antenna, fourth one or more directional beams; generating fourth one or more signals corresponding to the fourth one or more directional beams; transmitting, from the first antenna, second one or more directional beams corresponding to second one or more signals; determining the second one or more directions to transmit the second one or more directional beams; communicatively coupling, by a second switch matrix, the first antenna with the first lens antenna; and controlling the second switch matrix for communicatively coupling the fourth one or more signals with the second one or more signals.

Example 24: The method of Examples 19 and 23, further comprising:

communicatively coupling, by first one or more frequency-domain multiplexers, the second lens antenna with the corresponding first one or more signals; communicatively coupling, by second one or more frequency-domain multiplexers, the first lens antenna with the corresponding third one or more signals; communicatively coupling, by the second one or more frequency-domain multiplexers, the first lens antenna with the corresponding fourth one or more signals; and communicatively coupling, by the first one or more frequency-domain multiplexers, the second lens antenna with the corresponding second one or more signals.

Example 25: A node for wireless communications, comprising: a processor; a transceiver communicatively coupled to the processor; a memory communicatively coupled to the processor; and a switch matrix communicatively coupled to the transceiver and the processor, wherein the processor and the memory are configured to: receive, from a first antenna, first one or more directional beams; generate first one or more signals corresponding to the first one or more directional beams; transmit, from a first lens antenna, third one or more directional beams corresponding to third one or more signals; communicatively couple, by the switch matrix, the first antenna with the first lens antenna; and control the switch matrix for communicatively coupling the first one or more signals with the third one or more signals.

Example 26: The node of Example 25, wherein the processor and the memory are further configured to: receive, from the first lens antenna, fourth one or more directional beams; generate fourth one or more signals corresponding to the fourth one or more directional beams; transmit, from the first antenna, second one or more directional beams corresponding to second one or more signals; communicatively couple, by the switch matrix, the first antenna with the first lens antenna; and control the switch matrix for communicatively coupling the fourth one or more signals with the second one or more signals.

Example 27: The node of Example 26, further comprising one or more switches, wherein the first antenna comprises a second lens antenna, wherein the processor and the memory are further configured to: communicatively couple, by one or more switches, the second lens antenna with the switch matrix for bidirectional communications of the corresponding first one or more signals and the corresponding second one or more signals; and communicatively couple, by the one or more switches, the switch matrix with the second lens antenna for bidirectional communications of the corresponding first one or more signals and the corresponding second one or more signals.

Example 28: The node of Example 26, further comprising: first one or more duplexers; and second one or more duplexers, wherein the first antenna comprises a second lens antenna, wherein the processor and the memory are further configured to: communicatively couple, by the first one or more duplexers, the second lens antenna with the switch matrix for bidirectional communications of the corresponding first one or more signals and the corresponding second one or more signals; and communicatively couple, by the second one or more duplexers, the first lens antenna with the switch matrix for bidirectional communications of the corresponding third one or more signals and the corresponding fourth one or more signals.

Example 29: The node of Example 25, wherein the first antenna comprises a second lens antenna, wherein the processor and the memory are further configured to: receive, from the first lens antenna, fourth one or more directional beams; generate fourth one or more signals corresponding to the fourth one or more directional beams; transmit, from the first antenna, second one or more directional beams corresponding to second one or more signals; communicatively couple, by a second switch matrix, the first antenna with the first lens antenna; and control the second switch matrix for communicatively coupling the fourth one or more signals with the second one or more signals.

Example 30: The node of Examples 25 and 29, further comprising: first one or more frequency-domain multiplexers; and second one or more frequency-domain multiplexers, wherein the processor and the memory are further configured to: communicatively couple, by the first one or more frequency-domain multiplexers, the second lens antenna with the corresponding first one or more signals; communicatively couple, by the second one or more frequency-domain multiplexers, the first lens antenna with the corresponding third one or more signals; communicatively couple, by the second one or more frequency-domain multiplexers, the first lens antenna with the corresponding fourth one or more signals; and communicatively couple, by the first one or more frequency-domain multiplexers, the second lens antenna with the corresponding second one or more signals.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-16 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-16 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A node for wireless communications, comprising:
a first lens antenna comprising a first set of M antenna ports for receiving M first received beams, wherein M is a first positive integer;
a second lens antenna comprising a second set of N antenna ports for transmitting N first transmitted beams, wherein N is a second positive integer;
an M×N switch matrix communicatively coupled between the first lens antenna and the second lens antenna, the switch matrix comprising:
a third set of M power dividers coupled to the first set of M antenna ports, respectively, each power divider being configured for dividing an input signal from the respective antenna port into N equal phase signals;
a fourth set of M×N switches for controllably switching the M×N equal phase signals from the third set of M power dividers;
a fifth set of N power combiners coupled to the second set of N antenna ports, respectively, each power combiner being configured for combining M switched signals, one from each respective power divider of the third set of M power dividers; and
a switching controller for controlling a switching of the fourth set of M×N switches.

2. The node of claim 1, further comprising:
a sixth set of M amplifiers coupled to the first set of M antenna ports, respectively, for amplifying signals corresponding to the M first received beams; and
a seventh set of N amplifiers coupled to the fifth set of N power combiners, respectively, for amplifying signals corresponding to the N first transmitted beams; and
an amplifier controller for controlling a gain of the sixth set of M amplifiers and the seventh set of N amplifiers.

3. The node of claim 1,
wherein the first lens antenna is further configured for transmitting M second transmitted beams,
wherein the second lens antenna is further configured for receiving N second received beams,
wherein the fourth set of N power combiners is further configured for dividing an input signal from the respective antenna port into M equal phase signals, and
wherein the third set of M power dividers is further configured for combining N switched signals, one from each power combiner of the fourth set of N power combiners.

4. The node of claim 3, further comprising:
a sixth set of M dual-pole dual-throw (DPDT) switches coupled between the first set of M antenna ports and the third set of M power dividers, respectively, for bidirectionally switching between the M first received beams or the M second transmitted beams;
a seventh set of M amplifiers coupled to the sixth set of M DPDT switches, respectively, for amplifying signals corresponding to the M first received beams or the M second transmitted beams; and
an amplifier controller for controlling a gain of the seventh set of M amplifiers.

5. The node of claim 3, further comprising:
a sixth set of M duplexers coupled between the first set of M antenna ports and the third set of M power dividers, respectively, for providing bidirectional duplex communications between the first set of M antenna ports and the third set of M power dividers; and
a seventh set of N duplexers coupled between the second set of N antenna ports and the fifth set of N power combiners, respectively, for providing bidirectional duplex communications between the second set of N antenna ports and the fifth set of N power combiners.

6. The node of claim 3, further comprising:
a sixth set of M frequency-domain multiplexers coupled between the first set of M antenna ports and the third set of M power dividers, respectively, for multiplexing signals corresponding to the M first received beams, and signals corresponding to the M second transmitted beams; and
a seventh set of N frequency-domain multiplexers coupled between the second set of N antenna ports and the fifth set of N power combiners, respectively, for multiplexing signals corresponding to the N first transmitted beams, and signals corresponding to the N second received beams.

7. A method of wireless communications, comprising:
receiving M first received beams at a first lens antenna, wherein M is a first positive integer;
transmitting N first transmitted beams from a second lens antenna wherein N is a second positive integer;
dividing each of M first input signals corresponding to the M first received beams into N respective equal phase signals;
combining the M sets of N equal phase signals into N respective first output signals corresponding to the N first transmitted beams; and
switching the M sets of N equal phase signals to select one or more of the M first received beams for reception and one or more of the N first transmitted beams for transmission.

8. The method of claim 7, further comprising:
amplifying each of the M first input signals prior to dividing each of the M first input signals into N respective equal phase signals; and
amplifying each of the N first output signals after combining the M sets of N equal phase signals into the N respective first output signals.

9. The method of claim 7, further comprising
transmitting M second transmitted beams from the first lens antenna;
receiving N second received beams at the second lens antenna;
dividing each of N second input signals corresponding to the N second received beams into M respective equal phase signals; and
combining the N sets of M equal phase signals into M respective second output signals corresponding to the second transmitted beams.

10. The method of claim 9, further comprising:
bidirectionally switching between the M first received beams or the M second transmitted beams utilizing a set of M dual-pole dual-throw (DPDT) switches; and
amplifying signals corresponding to the M first received beams or the M second transmitted beams utilizing a set of M amplifiers.

11. The method of claim 9, further comprising:
bidirectionally duplexing communications between the M first input signals and the M second output signals; and
bidirectionally duplexing communications between the N second input signals and the N first output signals.

12. The method of claim 9, further comprising:
frequency-domain multiplexing the M first input signals and the M second output signals; and
frequency-domain multiplexing the N second input signals and the N first output signals.

\* \* \* \* \*